US010075399B2

(12) United States Patent
Miance et al.

(10) Patent No.: US 10,075,399 B2
(45) Date of Patent: Sep. 11, 2018

(54) METHOD AND SYSTEM FOR SHARING MEDIA CONTENT BETWEEN SEVERAL USERS

(71) Applicant: ALKYMIA, Jouy Mauvoisin (FR)

(72) Inventors: Marc Miance, Jouy Mauvoisin (FR); Isabelle Miance, Jouy Mauvoisin (FR); Laurent Martin, La Garenne-Colombes (FR)

(73) Assignee: ALKYMIA, Jouy Mauvoisin (FR)

( * ) Notice: Subject to any disclaimer, the term of this patent is extended or adjusted under 35 U.S.C. 154(b) by 421 days.

(21) Appl. No.: 15/004,632

(22) Filed: Jan. 22, 2016

(65) Prior Publication Data

US 2017/0214640 A1    Jul. 27, 2017

(51) Int. Cl.
*G06F 15/16* (2006.01)
*H04L 12/58* (2006.01)
*H04L 29/08* (2006.01)

(52) U.S. Cl.
CPC .......... *H04L 51/08* (2013.01); *H04L 51/10* (2013.01); *H04L 67/02* (2013.01); *H04L 67/34* (2013.01)

(58) Field of Classification Search
USPC .................................. 709/204, 205, 206, 213
See application file for complete search history.

(56) References Cited

U.S. PATENT DOCUMENTS

| | | | | |
|---|---|---|---|---|
| 2002/0160836 A1* | 10/2002 | Watanabe | ............... | A63F 13/12 463/42 |
| 2011/0041063 A1* | 2/2011 | Lee | ............... | G06Q 10/10 715/733 |
| 2011/0276901 A1* | 11/2011 | Zambetti | ............... | H04L 12/1827 715/753 |
| 2012/0233257 A1* | 9/2012 | Ashour | ............... | G06Q 10/10 709/204 |
| 2013/0073388 A1* | 3/2013 | Heath | ............... | G06Q 30/02 705/14.53 |
| 2013/0311561 A1* | 11/2013 | Ku | ............... | G06F 3/0484 709/204 |

(Continued)

FOREIGN PATENT DOCUMENTS

| | | |
|---|---|---|
| WO | 2012/166014 A2 | 12/2012 |
| WO | 2014154979 A1 | 10/2014 |

OTHER PUBLICATIONS

Extended European Search Report for Application No. 16152459.0, dated Apr. 14, 2016, 7 pages.

*Primary Examiner* — Liangche A Wang
(74) *Attorney, Agent, or Firm* — Osha Liang LLP

(57) ABSTRACT

The sharing of media contents between users is implemented in the context of a media content exchange whose topic is media content. Users may contribute by adding contribution media contents that forms a contribution to the topic relatively to a portion of the topic media content. The server application registers for each contribution association data representing the contribution and sends messages to the users participating to the media content exchange on the basis of the registered association data. The association data represent an association between the portion of the topic media content and the contribution media contents. The contribution of a user may be reproduced on the device of another user on the basis of contribution reproduction data received from the server application.

20 Claims, 18 Drawing Sheets

(56) References Cited

U.S. PATENT DOCUMENTS

2014/0344694 A1* 11/2014 Gomersall ............ G06F 3/0481
715/719
2014/0372910 A1* 12/2014 Alford Mandzic ..... H04L 67/10
715/753

* cited by examiner

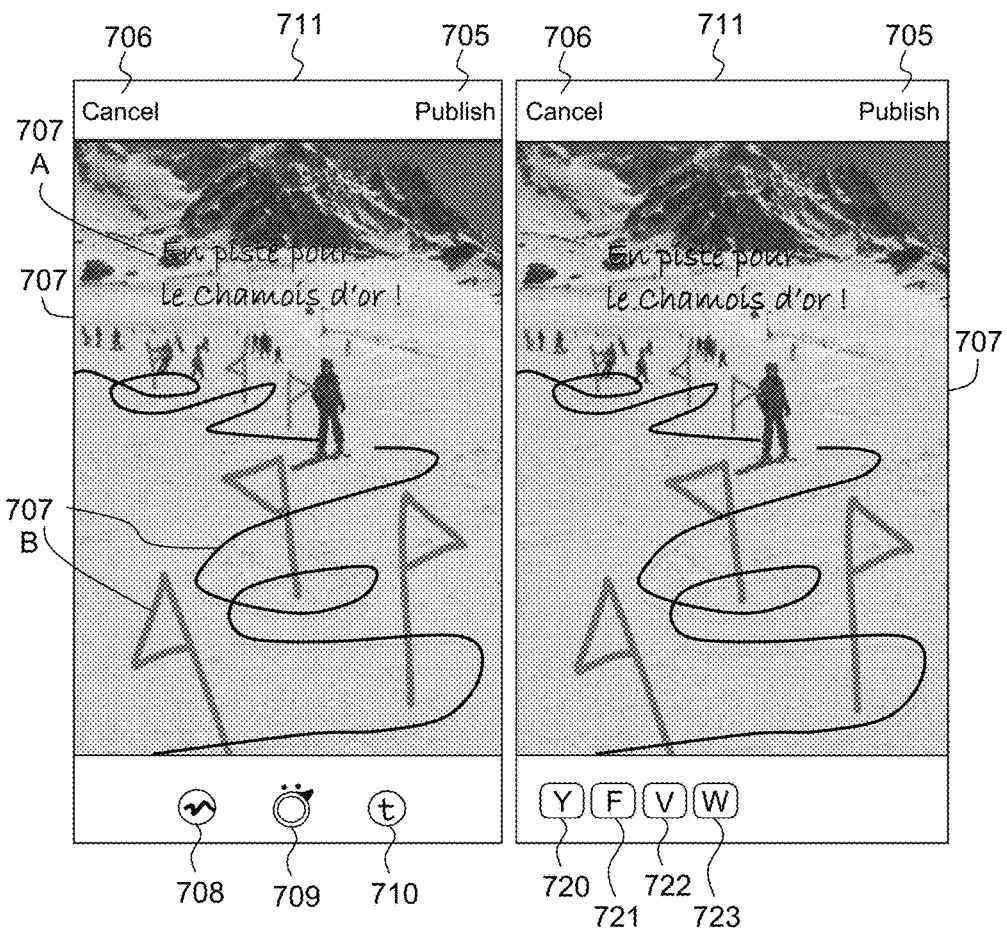

METHOD AND SYSTEM FOR SHARING MEDIA CONTENT BETWEEN SEVERAL USERS

TECHNICAL FIELD

The present subject disclosure generally relates to the field of telecommunication and digital data processing and more specifically to the exchange and/or sharing of media content between several users through at least one telecommunication network.

BACKGROUND

A known solution for sharing media content between several users consists in using email/messaging application for sending emails/messages with one or more media content as attachments or an hyperlink to a cloud media server. Each of the recipient users may then modify one of the received media contents and send a response email comprising the modified media content. Each recipient user of the modified media content may then further modify the media content and send a further response email comprising the further modified media content.

As a consequence, each time a recipient user wants to share with other users a modified media content, he has to send an email with the modified content to each other users or to upload the modified content to a cloud media server. The necessary bandwidth and the amount of data that have to be transmitted through the underlying telecommunication networks may thus drastically increase, in particular when the media content comprises a video content. In such a situation, each modified media content has a size which is similar or even bigger than that of the original media content.

Further, this kind of solution is not convenient when the recipient user wants to send an image-based content (i.e. image(s) or video) as an annotation of a received image-based content, because on the one hand, the software applications for combining video content are usually complex and difficult to use for non-expert user, and, on the other hand, in the absence of such a software application, the relationship between the original video content and the annotation video content may have to be explained separately, for example in a text message incorporated in a response email.

In addition, when the media content is an image-based media content, i.e. comprising at least one image, this kind of solution does not enable to track the contribution of each individual user concerning the modifications brought to an original media content especially because the amended image-based media content is usually sent in a single layer pixel format (BMP, JPEG, PNG, TIFF format etc.) in which the graphic/image elements have been combined with original media content and cannot be separated from original media content except by using some expert functions for image analysis and features recognition.

Further, the modification of the media content is usually performed in a dedicated software application for editing media contents which is usually distinct from the email/messaging application. Depending on the media content type (image, video, audio, etc.) this may represent a difficulty for a non-expert user.

SUMMARY

In general, in one aspect, the invention relates to a method for sharing media contents between several users. The method comprises sending, by a first client application executing on a first user device of an initiating user, to a server application, at least one request for registering a media content as a topic of a media content exchange between several users; allowing, by a second client application executing on a second user device, a contributing user to make a first contribution to said topic relatively to a first portion of the topic media content; sending, by the second client application, to said server application at least one request for registering first association data representing said first contribution, said first association data representing an association between the first portion of the topic media content and at least one first contribution media content selected to form said first contribution; receiving, by a third client application executing on a user device of a recipient user, from said server application, contribution reproduction data based on the first association data and; reproducing, by the third client application, said first contribution by rendering a first combined media content resulting from a combination of at least one portion of said first contribution media content with said first portion of the topic media content.

According to another aspect, the invention relates to a user device comprising a processor, a memory operatively coupled to the processor, said memory comprising instructions of a client application configured to communicate with a server application, said instructions comprising instructions for sending to said server application at least one request for registering a media content as a topic of a media content exchange between several users; allowing a contributing user to make a first contribution to said topic relatively to a first portion of the topic media content; sending, to said server application at least one request for registering first association data representing said first contribution, said first association data representing an association between the first portion of the topic media content and at least one first contribution media content selected to form said first contribution; receiving, from said server application, contribution reproduction data representative of a second contribution and; reproducing said second contribution by rendering a first combined media content resulting from a combination of at least one portion of a second contribution media content with a second portion of the topic media content.

According to another aspect, the invention relates to a system comprising a processor, a memory operatively coupled to the processor, said memory comprising instructions of a server application configured to communicate with at least one client application, said instructions comprising instructions for registering, on request of a first client application executing on a user device of an initiating user, a media content as a topic of a media content exchange between several users; registering, on request of a second client application executing on a user device of a contributing user, first association data representing a first contribution to said topic relatively to a first portion of the topic media content, said first association data representing an association between the first portion of the topic media content and at least one first contribution media content selected to form said first contribution; sending to a third client application executing on a user device of a recipient user, contribution reproduction data based on the first association data enabling a reproduction by the third client application of said first contribution, said reproduction comprising rendering a first combined media content resulting from a combination of at least one portion of said first contribution media content with said first portion of the topic media content.

According to another aspect, the invention relates to computer-readable storage medium storing computer-executable instructions comprising instructions of a client application configured to communicate with a server application, said instructions comprising instructions for sending to said server application at least one request for registering a media content as a topic of a media content exchange between several users; allowing a user to make a first contribution to said topic relatively to a first portion of the topic media content; sending, to said server application at least one request for registering first association data representing said first contribution, said first association data representing an association between the first portion of the topic media content and at least one first contribution media content selected to form said first contribution; receiving, from said server application, contribution reproduction data representative of a second contribution and; reproducing said second contribution by rendering a first combined media content resulting from a combination of at least one portion of a second contribution media content with a second portion of the topic media content.

BRIEF DESCRIPTION OF THE DRAWINGS

The present disclosure will be better understood and its numerous aspects and advantages will become more apparent to those skilled in the art by reference to the following drawings, in conjunction with the accompanying specification, in which:

FIG. 7A-7E represent user interfaces according to at least one embodiment.

DETAILED DESCRIPTION OF EMBODIMENTS

Figure 1A:
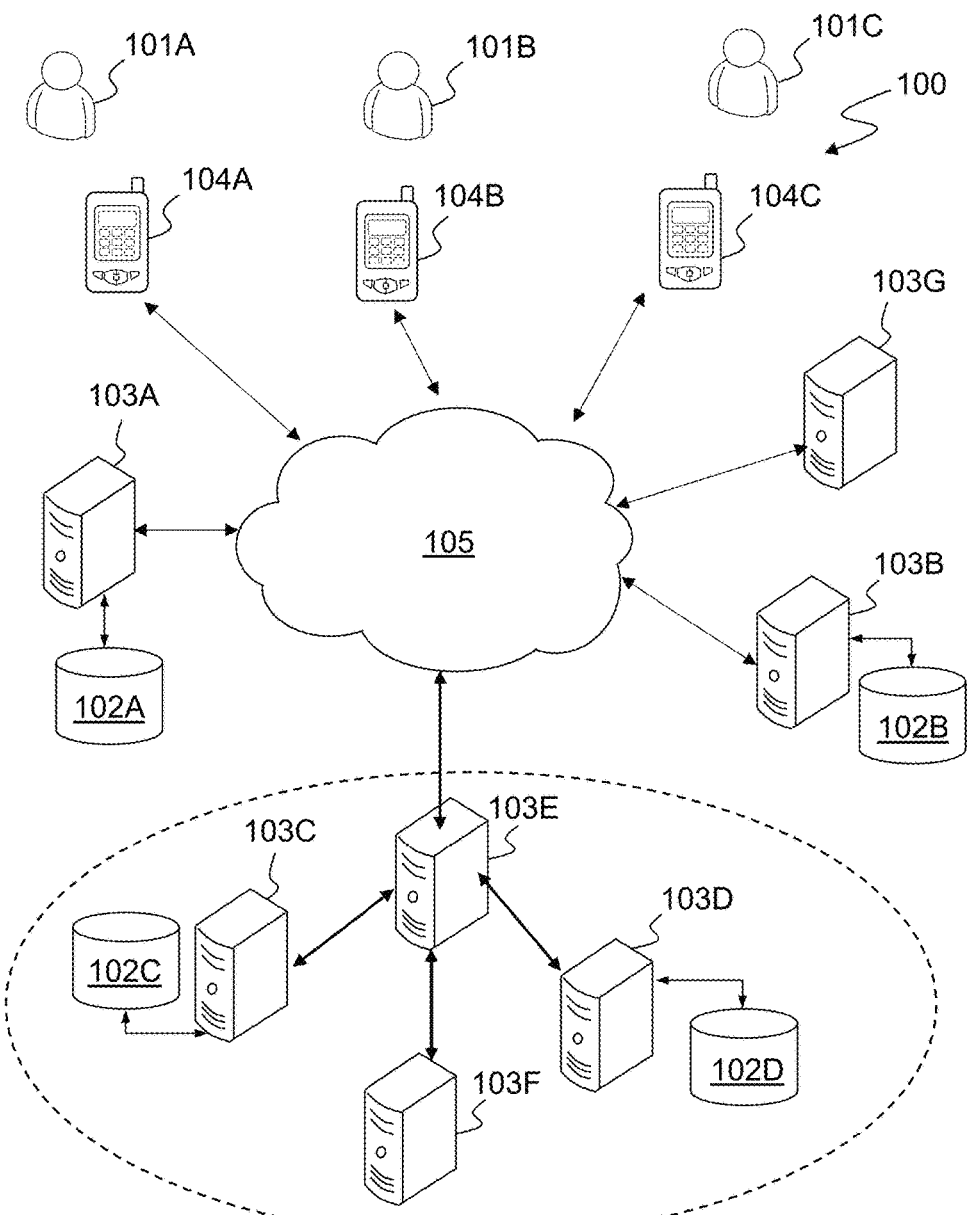
FIG. 1A is a schematic representation of a system for sharing media contents in accordance with one embodiment

Embodiments of the invention relate to a device, system and method for sharing media contents between several users. Different embodiments are disclosed herein The sharing or exchange of media contents between the users may be implemented in different technical ecosystems: for example in the context of a messaging service, of a discussion group, of a media content provider or of a social network.

When a discussion group is implemented in the context of a messaging service, the users participating to the media content exchange may be users invited by a first user. When the media content exchange is implemented in the context of a service of a media content provider, any user having access service of the media content provider may participate to the media content exchange. When the media content exchange is implemented in the context of a social network, some or all of the users connected with a given user may for example be selected for defining the group of users participating to the media content exchange.

A user participating to a media content exchange is referred to herein as a participating user. A participating user may select a topic for the media content exchange: a user selecting a topic media content is referred to herein as the initiating user. A participating user may make a contribution to a selected topic: a user making a contribution referred to herein as a contributing user. A participating user receiving information data on a topic selected by another user and/or on a contribution made by another user is referred to herein as a recipient user.

A media content is selected by an initiating user to form the topic for the media content exchange. A media content which forms a topic is referred herein as a topic media content.

A server application registers topic data to represent the selected topic.

The data file(s) encoding the topic media content are stored on a media server so as to be accessible to users participating to the exchange. The server application stores access data for accessing to the topic media content from a user device via the media server. The media server may be a remote media server accessible from a user device through a network.

Topic data may be sent by the server application to the participating users on the basis of the registered data representing the topic.

One or more participating user may contribute by adding one or more media contents that form a contribution to the selected topic relatively to a portion of the topic media content. A media content which forms a contribution to a topic is referred to herein as a contribution media content.

The server application registers for each contribution of a user association data representative of the contribution and sends messages to the participating users on the basis of the registered association data. The association data represent an association between the portion of the topic media content and the contribution media contents.

The data file(s) of the contribution media content are also stored on a media server so as to be accessible to users participating to the exchange. The association data may comprise access data for accessing to the contribution media content from a user device via the media server. The media server may be a remote media server accessible from a user device through a network.

In at least one embodiment, the registered association data comprise an identification of the portion of the topic media content relatively to which the contribution has been made. This identification may comprise at least one rendering coordinate defining a rendering point relatively to at least one axis of a rendering coordinate system associated with the topic media content.

The contribution of a user may be reproduced on the device of recipient user on the basis of the association data, received from the server application and representative of the contribution. Those association data may comprise an identification of the portion of the media content used as a topic. A combined media content resulting from a combination of at least a portion of the topic media content and contribution the media content may be rendered on the basis of the received identification of the topic portion of the media content.

As a consequence, it is no more necessary to send modified topic/contribution media contents from one user device to each other user devices. Network bandwidth may thus be saved. The media content(s) that form the topic of the discussion group or a contribution to the topic may be uploaded only once on a recipient user device of a participating user and the reproduction of the contribution of the users may be performed by this recipient user device on the basis of the received association data, for example according to the identification of the portion of the topic media content (or rendering coordinate) specified by the contributing user.

In at least one embodiment the tracking of the contribution of the different users is implemented, by registering of a user identifier of a contributing user in association with the data representing a contribution of the contributing user and by registering a user identifier of the initiating user in association with the data representing the topic. A user identifier may be displayed while rendering the contribution of a user on a user device.

The selection of a topic, contributions to a topic, selection, rendering and editing of media contents may be performed in the context of a single client application.

In addition, the topic media content may be a 3D content or a web page or any content provided by a source application, therefore providing new possibilities for exchanging media content between users.

The other advantages, and other features of the components disclosed herein, will become more readily apparent to those having ordinary skill in the art. The following detailed description of certain preferred embodiments, taken in conjunction with the drawings, sets forth representative embodiments of the subject technology, wherein like reference numerals identify similar structural elements.

In addition, it should be apparent that the teaching herein can be embodied in a wide variety of forms and that any specific structure and/or function disclosed herein is merely representative. In particular, one skilled in the art will appreciate that an embodiment disclosed herein can be implemented independently of any other embodiment and that several embodiments can be combined in various ways and that one or several aspects of different embodiments can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. Specifically, software instructions or computer readable program code to perform embodiments described herein may be stored, temporarily or permanently, in whole or in part, on a non-transitory computer readable medium of a local or remote storage device including one or more storage media.

As used herein, a computer storage medium may be any physical media that can be read, written or more generally accessed by a computer. Examples of computer storage media include, but are not limited to, a flash drive or other flash memory devices (e.g. memory keys, memory sticks, key drive), CD-ROM or other optical storage, DVD, magnetic disk storage or other magnetic storage devices, memory chip, RAM, ROM, EEPROM, smart cards, or any other suitable medium from that can be used to carry or store program code in the form of instructions or data structures which can be read by a computer processor. Also, various forms of computer-readable medium may be used to transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Basic, HTML, PHP, Java, Javascript, etc.

Turning now to the drawings, wherein like numbers denote like parts throughout the several views, FIG. 1 illustrates an example content sharing system 10 in which the various technologies and techniques described herein may be implemented.

The content sharing system 100 includes one or more computing servers 103A-103G and a plurality of user devices 104A-104C which are operatively coupled to with one another through a network 105.

The network 105 may be any data transmission network, for example a wired (coaxial cable, fiber, twisted pair, DSL cable, etc) or wireless (radio, infrared, cellular, microwave, etc) network, a local area network (LAN), internet area network (IAN), metropolitan area network (MAN) or wide area network (WAN) such as the Internet, a public or private network, a virtual private network (VPN), a telecommunication network with data transmission capabilities, a single radio cell with a single connection point like a Wifi or Bluetooth cell, etc.

Each user device 104A-104C may be implemented as a single hardware device, for example in the form of a desktop personal computer (PC), a laptop, a personal digital assistant (PDA), a smart phone or may be implemented on separate interconnected hardware devices connected one to each other by a communication link, with wired and/or wireless segments.

Each user device 104A-104C generally operates under the control of an operating system and executes or otherwise relies upon various computer software applications, components, programs, objects, modules, data structures, etc.

Figure 1B:
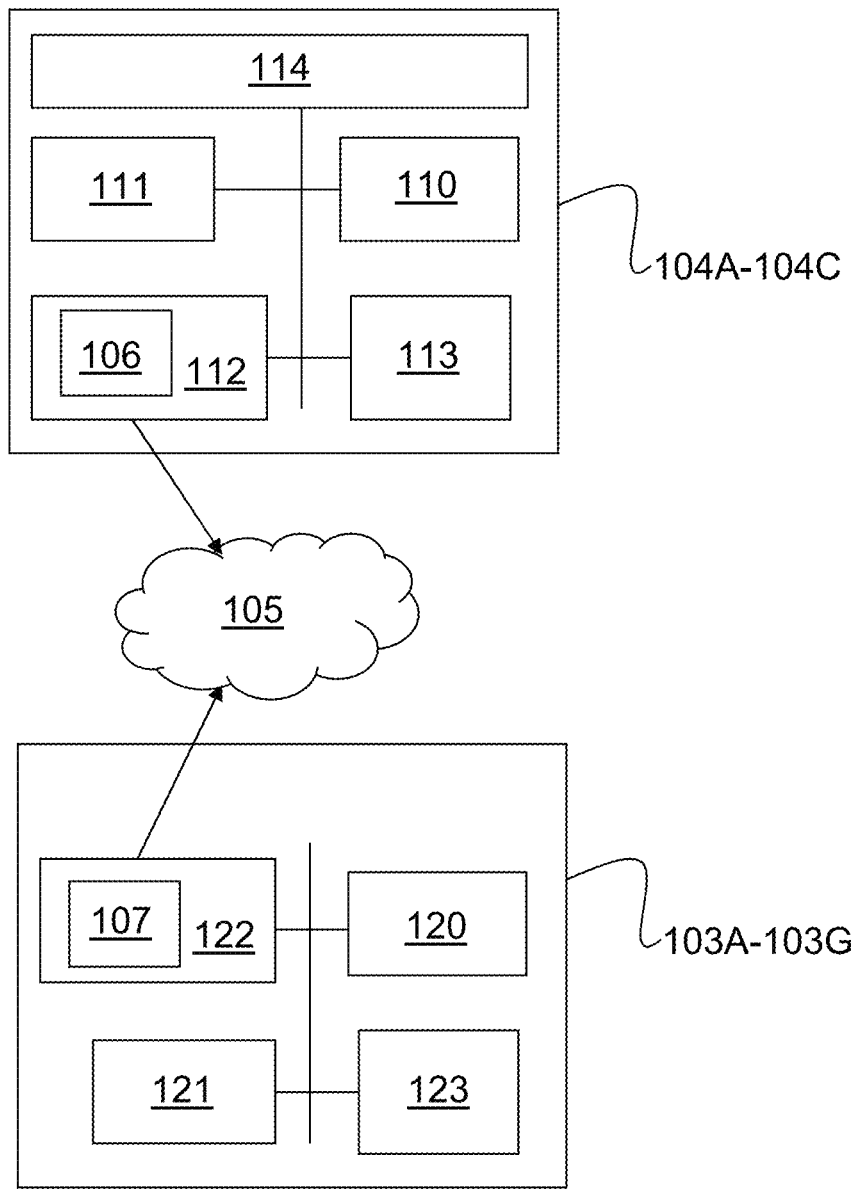
FIG. 1B is a schematic representation of a user device and computing server in accordance with one embodiment.

As represented schematically on FIG. 1B, In one or more embodiments, a user device 104A-104C comprises a processing unit 110, memory 111, one or more computer storage media 112, and other associated hardware such as input/output interfaces (e.g. device interfaces such as USB interfaces, etc., network interfaces such as Ethernet interfaces, etc.) and a media drive 113 for reading and writing the one or more compute storage media 112.

The memory 111 of a user device 104A-104C may be a random access memory (RAM), cache memory, non-volatile memory, backup memory (e.g., programmable or flash memories), read-only memories, or any combination thereof. The processing unit 110 of a user device 104A-104C may be any suitable microprocessor, integrated circuit, or central processing unit (CPU) including at least one hardware-based processor or processing core.

In one or more embodiments, each computer storage medium or media 112 of a user device 104A-104C may contain computer program instructions which, when executed by the computing device 105, cause the user device 104A-104C to perform one or more method described herein for a user device 104A-104C. The processing unit of a user device 104A-104C may be configured to access to said one or more computer storage media 112 for storing, reading and/or loading computer program instructions or software code that, when executed by the processor, causes the processor to perform the steps of a method described herein for a user device 104A-104C. The processing unit 110 of a user device 104A-104C may be configured to use the memory 111 of a user device 104A-104C when executing the steps of a method described herein for a user device 104A-104C, for example for loading computer program instructions and for storing data generated during the execution of the computer program instructions.

Each user device 104A-104C also generally receives a number of inputs and outputs for communicating information externally. For interface with a user 101A-101C or operator, a user device 104A-104C generally includes a user interface 114 incorporating one or more user input/output devices, e.g., a keyboard, a pointing device, a display, a printer, etc. Otherwise, user input may be received, e.g., over a network interface coupled to the network 105, from one or more external computers, e.g., one or more user device 104A-104C or other computing servers 103A-103G.

Each computing server 103A-103G may be implemented as a single hardware device or may be implemented on separate interconnected hardware devices connected one to each other by a communication link, with wired and/or wireless segments. Each computing server 103A-103G may be implemented within a cloud computing environment.

In at least one embodiment, the set of computer servers 103A-103G comprise three media servers 103A-103C, a database server 103D, a front-end server 103E, a processing server 103F and a messaging server 103G.

Each computing server 103A-103G generally operates under the control of an operating system and executes or otherwise relies upon various computer software applications, components, programs, objects, modules, data structures, etc.

As represented schematically on FIG. 1B, in one or more embodiment, a computing server 103A-103G comprises a processing unit 120, memory 121, one or more computer storage media 122, and other associated hardware such as input/output interfaces (e.g. device interfaces such as USB interfaces, etc., network interfaces such as Ethernet interfaces, etc.) and a media drive 123 for reading and writing the one or more computer storage media 122.

The memory 121 of a computing server 103A-103G may be a random access memory (RAM), cache memory, non-volatile memory, backup memory (e.g., programmable or flash memories), read-only memories, or any combination thereof. The processing unit 120 of a computing server 103A-103G may be any suitable microprocessor, integrated circuit, or central processing unit (CPU) including at least one hardware-based processor or processing core.

In one or more embodiments, each computer storage medium or media 122 of a computing server 103A-103G may contain computer instructions which, when executed by the computing device 105, cause the computing server 103A-103G to perform one or more method described herein for a computing server 103A-103G. The processing unit 120 of a computing server 103A-103G may be configured to access to said one or more computer storage media 122 for storing, reading and/or loading computer program instructions or software code that, when executed by the processor, causes the processor to perform the steps of a method described herein for a computing server 103A-103G. The processing unit 120 of a computing server 103A-103G may be configured to use the memory 121 of a computing server 103A-103G when executing the steps of a method described herein for a computing server 103A-103G, for example for loading computer program instructions and for storing data generated during the execution of the computer program instructions.

Each user device 104A-104C is operatively connected to one or more computing servers 103A-103G through the network 105. Each user device 104A-104C is configured to communicate through at least one communication link with at least one of the computing servers 103A-103G.

In one or more embodiments, each user device 104A-104C executes computer program instructions of a client software application 106 (also referred to as "client application 106") that, when executed by the processor of the user device, causes the processor to perform the method steps described herein for any of the user devices 104A-104C.

In one or more embodiments, on at least one of the computer server 103E-103F executes computer program instructions of a server software application 107 (also referred to as "server application 107") that, when executed by the processor of one of the computer server 103E-103F, causes this processor to perform the method steps described herein for one of the computer server 103E-103F.

In one or more embodiments, the server application 107 is executed by the front-end server 103E, which is itself operatively connected to at least one of the computer servers 103C, 103D, 103F, 103G for implementing the steps of a method described herein for the server application 107. In at least one embodiment the processing server 103F is used as an auxiliary server for the front-end server 103E to run some time consuming processing functions (for example media content processing functions, such as media transcoding functions, media content format decoding and/or encoding, etc) on request of the front-end server 103E.

Each instance of the client software application 106 and the server software application 107 are configured to be operatively coupled to each other to communicate in a client/server mode through at least one communication link. The communication link between a client software application 106 and the server software application 107 may use any suitable communication protocol. For example, a HTTP (Hyper Text Transfer) based protocol may be used, such a web service communication protocol like SOAP (Simple Object Access Protocol). Any other protocol may be used, for example a proprietary protocol.

In one or more embodiments, the client application 106 of a user device 104A-104C is operatively connected to the server application 107 for implementing an embodiment of a method for sharing media content disclosed herein. The client application 106 comprises computer program instructions for communicating by means of messages with the server application 107. In at least one embodiment, the client application 106 comprises computer program instructions for generating, sending to the server application 107 and for receiving and processing messages received from the server application 107. The server application 107 comprises computer program instructions for communication with the client application 106, in particular for generating and sending to the client application 106 and for receiving and processing messages received from the client application 106.

The messages sent by the server application 107 or respectively the client application 106 may be messages comprising data related to a media content exchange between several users 101A-101C, for example data related to a user, to a media content, to a topic of a media content exchange, to a contribution made by a user in the context of the media content exchange. The messages sent by the server application 107 or respectively the client application 106 may be any kind of messages: messages, requests, information messages, messages with user generated content or computer generated content, etc.

Each media server 103A-103C is operatively coupled to one or more media content databases 102A-102C for storing media content. Each media server 103A-103C provides an interface for receiving and processing data request for media content stored in one media content database 102A-102C, for example request for storing media content in one media content database 102A-102C and for retrieving, searching, modifying media content stored in one media content database 102A-102C.

Each media server 103A-103C may be any web server application, remote server application, storage server in a cloud, or more generally any software application configured to store and retrieve media contents and to process upload requests—or respectively download requests—from a remote device for uploading—or respectively downloading—one or more media contents. For example, the media server 103A is a web server which is accessible through Internet from all the user devices 104A-104C, the media server 103B is a media server in a cloud computing environment, which is accessible only for one of the user device 104A-104C.

In at least one embodiment, the media server 103C may be implemented as a content delivery network (CDN) for storing content which have to be available not only from the front-end server 103E but also from any of the user devices 104A-104C. The media server 103C is used for storing media content, which are stored on one of the user devices 104A-104C or one of the media server 103A-103B when this media content have to be accessible from each of the user devices 104A-104C.

In the context of the present disclosure, a media content may be a video content, an audio content, a text content, an image content, a graphic content, or any combination thereof, for example a web page or a multimedia content. A video content may be a 3D video content, a 3D content, a stereoscopic video content, a 2D video content, a list of independently coded images, etc. An audio content may be a mono audio content, a stereo audio content, a 3D audio content, etc. A media content may be coded in any format including for example JPEG, TIFF, MPEG, WAV, WORD, HTM, OBJ, DAE, FBX, DXF, X3D, MOV (QUICK-TIME®), etc.

The data of a media content may be encoded within one or several data files. For example, a video content may be encoded as a group of images, each image being encoded in a separate data file.

In one or more embodiment, one or more rendering points on a media content are used. A rendering point on a media content may be defined by a set of at least one rendering coordinate relatively to a rendering coordinate system associated with this media content. In one or more embodiments, a rendering point defines a user view on that portion (part, extract or media subset) of the media content. In one or more embodiments, a rendering point identifies this portion of that media content. This portion of the media content may for example be extracted from the media content to be rendered for a user.

In one or more embodiments a rendering point defines a start position from which the rendering of this media content may start. In one or more embodiments, a rendering point identifies a portion of that media content starting at that start position. This rendering point may be selected by a user and the corresponding portion of the media content may be rendered.

In at least one embodiment, the start position is a temporal coordinate relatively to a temporal axis of the rendering coordinate system and the portion of the media content is a set of at least one user view of the media content starting at that temporal coordinate.

In at least one embodiment, the start position is a spatial coordinate relatively to a one or two-dimensional coordinate system of the rendering coordinate system and the portion of the media content is a zone of a page of the media content starting at that spatial coordinate.

When the media content is a "visual content" (e.g. a video content, image content, graphic content or text content) and may define a specific view on that visual content. A rendering point will thus also be referred to in the present disclosure as a "viewpoint" or "point of view" or POV for all kind of content including video and audio contents.

Different examples of rendering point are given below.

For example, a rendering point on a media content which is a video content may be defined by an image identifier (image number, timecode, or any other identifier), the portion of that media content being thus the image identified by that image identifier. In such an example, the associated rendering coordinate system is a three-dimensional coordinate system comprising a temporal axis defining the image number or timecode. The image identifier thus defines a start position relatively to that temporal axis.

For example, a rendering point on a media content which is a video content may be defined by two image identifiers, the portion of that media content being the image sequence between a first image identified by the first image identifier and a second image identified by the second image identifier. In such an example, the associated rendering coordinate system is a three-dimensional coordinate system comprising a temporal axis defining the image number or timecode.

For example, a rendering point on a media content which is a 3D video content of a scene may be defined by a temporal coordinate (start position, timecode, or any other identifier) and at least one camera position (e.g. coordinates of the camera in the three dimensional space corresponding to scene acquired by the camera), the portion of that media content being thus the view identified by that temporal coordinate and that camera position. In such an example, the associated rendering coordinate system is a four-dimensional rendering coordinate system comprising a temporal axis defining the image number (i.e. a temporal position in the video content) and a three-dimensional coordinate system for defining the camera position.

For example, a rendering point on a media content which is a text content may be defined by one or two character identifiers (character number or position within an alphanumeric sequence encoding the text), the portion of that media content being thus the text comprised between a first character identified by the first character identifier and a second character identified by the second character identifier. In such an example, the associated rendering coordinate system is a one-dimensional coordinate system identifying the characters in the alphanumeric sequence. The character identifier(s) thus define a start position relatively to a one-dimensional coordinate system.

For example, a rendering point on a media content which is an audio content may be defined by a temporal position (timecode, or time), the portion of that media content being thus a portion of the audio content starting at that temporal position. In such an example, the associated rendering coordinate system is a one-dimensional coordinate system corresponding to the temporal axis of the audio media content.

For example, a rendering point on a media content which is an image may be defined by two points in the image, the portion of that media content being thus the sub-image having the first point as the top right corner and the second point as the bottom left corner. In such an example, the associated rendering coordinate system is a two-dimensional coordinate system corresponding to the vertical and horizontal axis of the image. The points thus define a start position relatively to that two-dimensional coordinate system. Alternatively a single point (top left/right corner e.g.) and a width and height of the sub-image may be used to define the sub-image.

For example, a rendering point on a media content which is a web page provided by a web server may be defined by two points in the page or the top left/right corner of a page zone and a width and height of that page zone, the portion of that media content being thus the defined page zone. In such an example, the associated rendering coordinate system is a two-dimensional coordinate system corresponding to the vertical and horizontal axis of the web page. The points thus define a start position relatively to that two-dimensional coordinate system.

For example, a rendering point on a media content which is an image content provided by a source software application such as navigation application may be defined by a geographic position (e.g. a set of geographic coordinates, that may be in GPS system or other geographic localization system), the portion of that media content being thus an image or representation of a geographic zone around that geographic position generated by that navigation application for that geographic position. In such an example, the associated rendering coordinate system is the two-dimensional or three-dimensional coordinate system of the localization system.

In one or more embodiments, the client application 106 of a user device 104A-104C comprises computer program instructions for processing media contents. Those computer program instructions for processing media contents may comprises computer program instructions for implementing a multimedia player or renderer, e.g. for loading in a memory and rendering at least one portion of a media content. For example, the client application 106 comprises at least some functionalities of an audio and/or video player, an image viewer, a text reader, a web page reader, 3D reader, 3D viewer, etc.

In one or more embodiments, the client application 106 of a user device 104A-104C comprises computer program instructions for implementing a media content editor, thus enabling a user to create and/or edit at least one media content. For example, the client application 106 comprises functionalities of an image editor, a video editor, an audio content editor, a text editor, a graphic editor, etc.

In at least one embodiment, the client application 106 of a user device 104A-104C comprises computer program instructions for obtaining filter parameters and for applying a filter to a media content according to at least one filter parameter.

In one or more embodiments, the client application 106 of a user device 104A-104C comprises computer program instructions for obtaining combination parameters and for generating a combined media content from at least two media contents according to at least one combination parameter.

In one or more embodiments, the client application 106 of a user device 104A-104C is operatively connected to one or more media servers 103A-103C and comprises computer program instructions for requesting a media content from a remote media servers 103A-103C, for uploading one or more media contents to a remote media servers 103A-103C and for downloading one or more media contents from a remote media servers 103A-103C.

The database server 103D is operatively coupled to one or more databases 102D for storing data related to media content exchange. The database server 103D implements a database management system (ORACLE®, SQL, Sybase® . . . ) and provides an interface for receiving and processing data request for data stored in one the databases 102D, for example request for storing, retrieving, searching, modifying data stored in one the databases 102D.

In one or more embodiments, the database 102D is used for storing data sets representing different entities related to a media content exchange and the relationships between those entities. A data set may be a data structure in a software application, an object in the context of an object-oriented software, a set of data representing an entity of relational database software, etc.

In one or more embodiments, the database 102D is used for storing several data sets concerning the users 101A-10C and their user devices 104A-104C. The database 102D is used for storing user data sets representing user accounts of users 101A-101C and device data sets representing user devices 104A-104C used by the users 101A-101C. While FIG. 1 represents only one user device for one user, each user 101A-101C may use one or more user devices configured with a client software application 106 for communicating with the server software application 107. Those data sets are used for controlling the access of the user to the server application 107 and for identifying the device(s) used by a given user when accessing to server application 107.

In one or more embodiments a user data set may comprise a user identifier, a user name, a user password, a creation time, a modification time, and an access time. The user identifier may be a user email, an alphanumerical string, a picture, etc. The user identifier may be used to uniquely identify a user account. The user identifier may be allocated by the server application 107. The user account may be a user account specific to the client application 106 and the method of sharing content described herein or a user account of another software application in the context of which the client application 106 is executed. In one or more embodiments a device data set may for example comprise a device identifier, a device type, an operating system identification, a creation time, a modification time, and an access time.

In one or more embodiments, the database 102D is used for storing several data sets concerning the media content exchanges between users. Those data sets may be organized and stored in different ways. Those data sets are used to define relationships and/or associations between users, media contents and user groups. Those data sets are stored in association for coding and representing the events occurring during one or more communication sessions established between the users participating to one or more media content exchanges. In at least one embodiment, those events comprises at least the creation of a user group, the definition of a new topic for a media content exchange and the contribution of a user to a topic of a media content exchange.

In one or more embodiments the data sets in the database 102D comprise user group data sets, topic data sets, rendering point data sets, media content data sets.

A user group data set represents a user group and may comprise a user group identifier, a creation time and/or a modification time. A creation (respectively modification) time may correspond to a time at which the user group data set is created (respectively modified) and coded in the form of a timestamp according to a universal clock.

A media content data set represents a media content and may comprise a media content identifier, a content type and/or a creation time. A creation time may correspond to a time at which the media content data set is created and coded in the form of a timestamp according to a universal clock. A media content data set may in addition comprise access data specifying how to access to the media content. The access data may comprise at least one of a media content identifier, a hypertext link (URL, Uniform Resource Locator), an account identifier, a password, or a combination thereof. The media content identifier may be a unique content identifier allocated to a media content by a media server media server 103A-103C to be used for requesting the media content data (e.g. for downloading the media content) from that media server 103A-103C.

A rendering point data set represents a rendering point of a contribution, i.e. a portion on a media content that forms a topic, and may comprise a rendering point identifier, at least one rendering coordinate, a creation time and/or a modification time. A creation (respectively modification) time may correspond to a time at which the rendering point data set is created (respectively modified) and coded in the form of a timestamp according to a universal clock.

A topic data set represents a topic of a media content exchange and may comprise a topic identifier, a topic type (/* à quoi cela sert-il? */), a creation time and/or a modification time. A creation (respectively modification) time may correspond to a time at which the topic data set is created (respectively modified) and coded in the form of a timestamp according to a universal clock.

In one or more embodiments, the database 102D is used for registering the relationships between different data sets: those relationships represent the relationships or associations between the entities represented by those data sets.

In one or more embodiments, the functionalities described herein for the client application 106 of a user device 104A-104C are integrated into a host application. The host application may be a messaging application like IMessage®, WhatsApp®, Facebook Messenger®, Gmail®, Skype®, etc. The host application may be a web application, for example a social network web application like Facebook®, Twitter®, or a media content provider application such as YouTube®. The functionalities of the client application 106 described herein may be implemented by a plug-in, add-on or one or more software component of the host application.

In at least one embodiment, the host application is configured to communicate with a messaging server application executing on the messaging server messaging server 103G.

In one or more embodiments, the host application comprises computer program instructions for implementing messaging sessions via the messaging server 103G. The messaging sessions may be instant messaging session, email messaging session, discussion groups or other form of messaging session, whether synchronous or asynchronous.

In at least one embodiment, the messages sent or received by the messaging server 103G are used for sending commands, data and/or information related to a media content exchange from/to the server application 107 and/or from/to a user device 104A-104C.

For example, the messaging server 103G may send a text message, comprising a user group identifier of a user group or of a topic registered by the server application 107. On receipt of this text message, the client application 106 is configured to establish a communication session with the server application 107 so as to receive message(s) from the server application 107 regarding this user group or this topic, the users of the user group and/or the contribution media contents registered by the server application 107 in association with the topic.

In one or more embodiments, the user interface of the client application 106 is configured to provide information to a user regarding this user group and to implement user interface items for allowing a user to make a contribution to the topic associated with the user group while remaining in the context of the host application.

FIGS. 2A-2G shows flowcharts in accordance with one or more embodiments of a method for sharing media content between several users. While the various steps in the flowchart are presented and described sequentially, one of ordinary skill will appreciate that some or all of the steps may be executed in different orders, may be combined or omitted, and some or all of the steps may be executed in parallel.

FIG. 2A-2G illustrate several aspects and embodiments of a method for sharing media content between several users: the registration of a user group, the registration of a topic, the registration of a contribution, the registration of a media content and the rendering of media content(s). In at least one embodiment, the steps of the methods described by reference to FIG. 2A-2G are performed by the client application 106 or the server application 107.

Figure 2A:
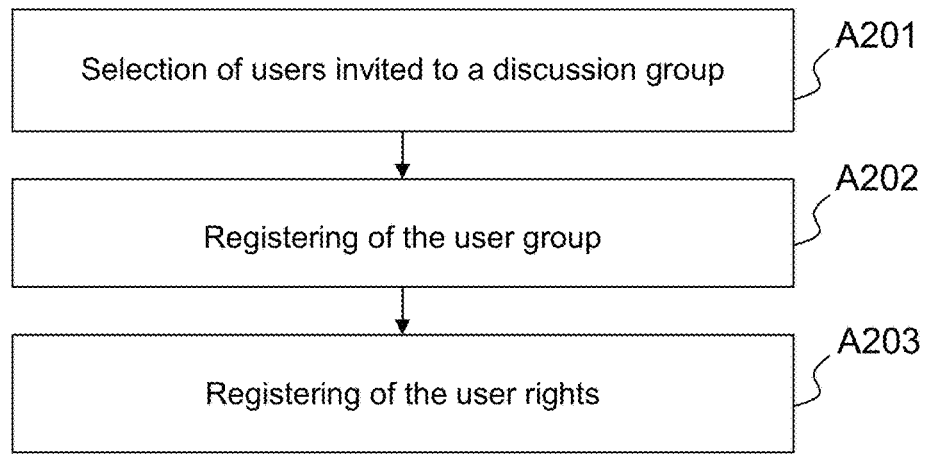
FIG. 2A-2G illustrate respectively a flow diagram of an exemplary method according to at least one embodiment.

More specifically, FIG. 2A illustrates one embodiment of a method for registering a user group. The user group may for example correspond to a discussion group or any user group defined in a messaging application.

A first user (or "initiating user"), for example user 101A, wants to share media content with other users. User 101A uses its user device 104A configured with a software application 106 to register a discussion group.

In step A201, one or more users (also referred to herein as "invited users") to be invited to the discussion group are selected, either automatically or by the initiating user 101A. The user interface of the client application 106 may for example comprise at least one user interface item for selecting users. For example the user interface is used for displaying a contact list in which the initiating user 101A may select one or more users. The contact list may be a list of contacts managed by the operation system of user device 104A, a list of contacts created by means of client application 106, or a list of contacts created by means of another client application, for example a client application of the messaging server 103G or a contact list created and managed by the front-end server 103E.

The initiating user 101A selects in the displayed contact list one or more contacts representing users that the initiating user 101A wants to invite to the discussion group and the client application 106 obtains a list of at least one user to be invited to the discussion group. For example, user 101B and user 101C are invited to participate to the discussion group with the initiating user 101A.

In step A202, the client application 106 of user device 104A sends to the server application 107 at least one request for registering the newly created discussion group GR1. In one or more embodiment, the registration of the discussion group is performed by the server application 107 by allocating to the discussion group GR1 a user group identifier and by creating and recording a user group data set representing the discussion group GR1 in the database 102D.

Figure 3A:
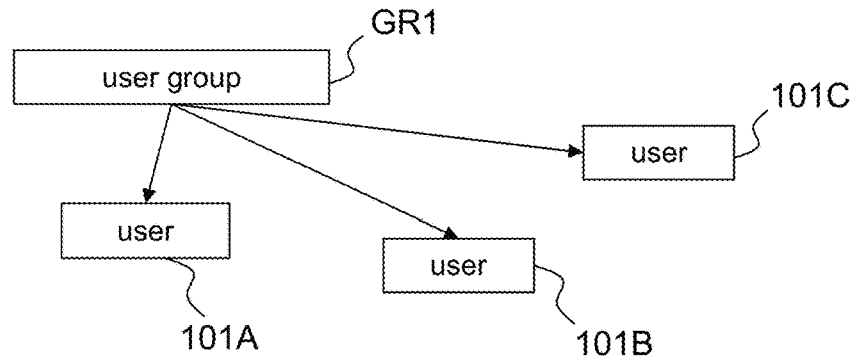
FIG. 3A-3D are different entity-relationship diagrams according to an example embodiment.

For example, as represented schematically by the entity-relationship diagram of FIG. 3A, for each user participating to the discussion group, including the initiating user 101A and the invited users 101B and 101C, a user data set representing the participating users 101A-101C is stored in the database 102D in association with the user group data set.

In step A203, the client application 106 of user device 104A sends to the server application 107 at least one request for registering in the database 102D the user rights relatively to the discussion group. The user rights may be defined automatically, for example on the basis of default values, or be defined by the initiating user 101A for each invited user. For example, different users invited to participate to a discussion group may have different levels of right.

At a first right level the invited user may participate (e.g. view and render the media content exchanged between the user in the context of the discussion group) but not make a contribution. At a second level the invited user may make a contribution. At the second right level the invited user may also invite users to participate to the discussion group. A more complete set of rights may be assigned by default to the initiating user 101A. At a third level of right, the initiating user may for example make a contribution, invite users to participate to the discussion group, assign level of right to the participating users, revoke rights, reject an invited user, etc.

In one or more embodiment, the registration of the user rights is performed by the server application 107 by storing for each user a right level information in association with the user group data set representing the user group GR1 and the user data set representing the participating user.

Alternatively, an existing discussion group, which has been created by means of a host application in which the client application 106 is integrated is used. In this alternative, a user identifier of each user belonging to an existing discussion group is provided by the client application 106 to the server application 107 for registration by server application 107 of a user group data set representing this discussion group in relationships with user data sets representing the different users belonging to this discussion group GR1.

Figure 2B:
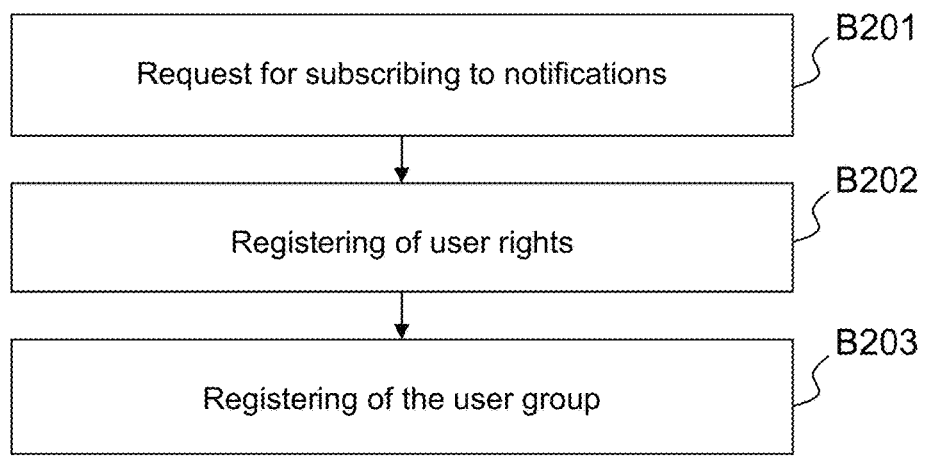

FIG. 2B illustrates one embodiment of a method registering a user group corresponding to users accessing to a service of a media content provider. The steps B201-B203 described below may be executed several time, for example for each new user to be registered.

A first user, for example user 101A, wants to access to media content(s) published or otherwise accessible in the context of a service of a media content provider. For example, the service may be a service for providing media contents via a web site, wherein those media content(s) may be accessed and viewed by users, with or without a subscription to the service.

In step B201, the server application 107 receives from the client application 106 executing on the user device 104A a request for registering a new user 101A relatively to a media content exchange. The server application 107 allocates a user identifier to user 101A and register a user data set representing a user account for user 101A. Optionally user 101A may specify subject matter(s) or domain(s) of interest for which user 101A would like to receive notifications and/or to share content with other users.

In step B202, the server application 107 registers in the database 102D the user rights of user 101A. The user rights may be defined automatically, for example on the basis of default values or may be dependent on a subscription scheme. For example, at a first level of rights, the user may have right to access to media contents available via the media content provider but not to make contribution relatively to those media content. At a second level the invited user may additionally make a contribution relatively to a media content available via the media content provider. At a third level of right, the user may additionally publish a new media content via the media content provider.

In step B203, when several users share a same domain(s) of interest, the server application 107 registers a user group comprising all the concerned users. The registering of the user group is performed by the server application 107 by allocating to the discussion group GR1 a user group identifier and by creating and recording a user group data set representing the user group GR1 in the database 102D. Each user data set of a user belonging to the user group is also stored in association with the user group data set.

New users may be added to the user group depending on further registering requests that may be received at next execution of step B201.

Figure 2C:
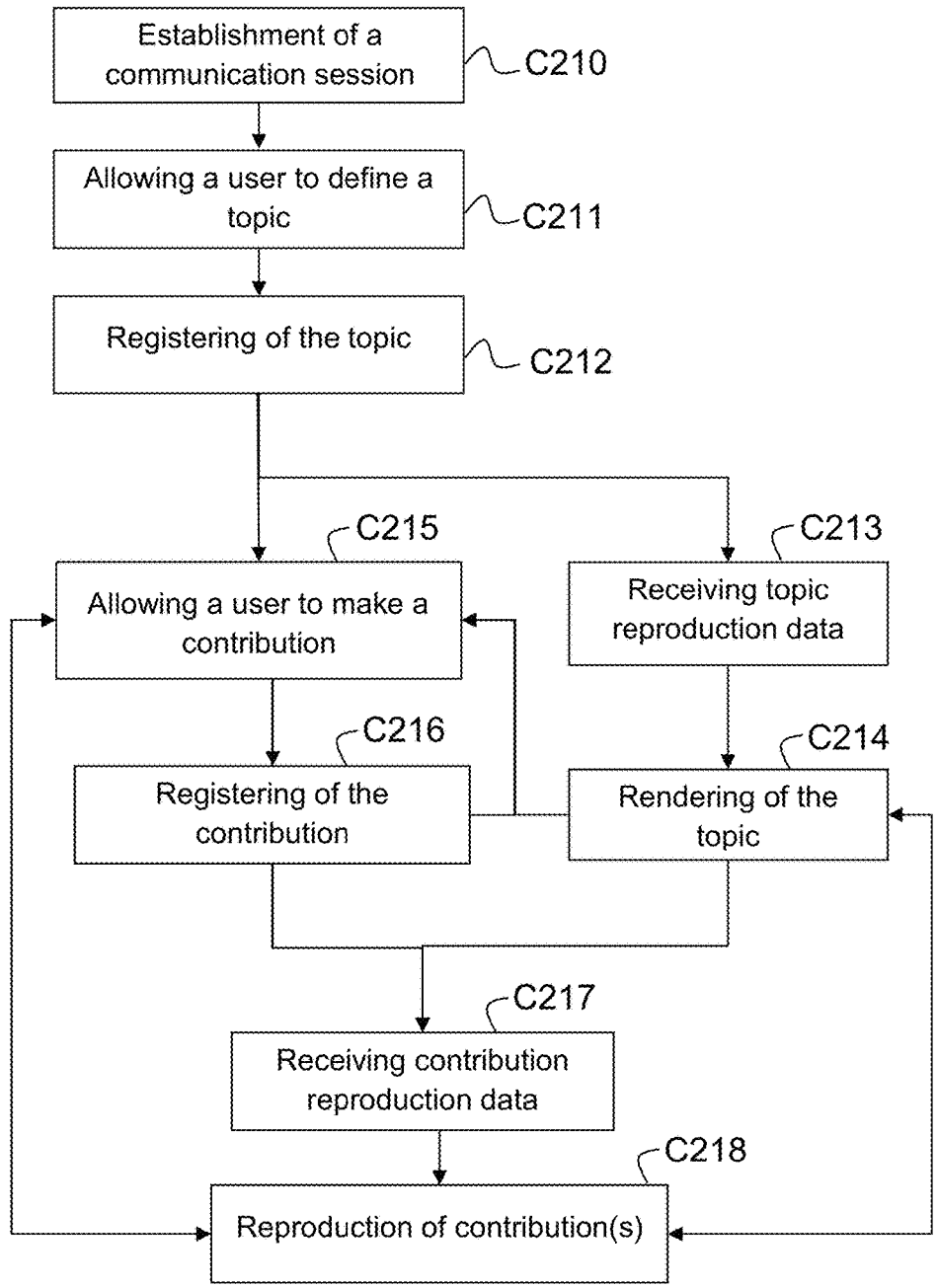

FIG. 2C illustrates one embodiment of a method for sharing media content between several users. The method may be implemented before or after the registering of a user group according to the methods described by reference to FIGS. 2A and 2B. The method may also be implemented without any user group.

Referring to FIG. 2C, in step C210, an initiating user, for example user 101A, wants to share media content with other users participating to a media content exchange. The client application 106 of user devices 104A-104C establishes a communication session with the server application 107 using an appropriate communication protocol.

In one embodiment, when a client application 106 of a user device 104A-104C establishes a communication session with the server application 107, the client application 106 receives all messages and data that this client application 106 should have received if the communication session had already been established at the time a topic is defined or a contribution is made or a user group is defined. The messages and data to be sent to a client application 106 may for example be determined on the basis of timestamps registered for the different data sets stored by the server application 107 in the database 102D when registering a topic, a contribution, a media content, a user or a user group. In the detailed description below, in order to simplify the description of the different embodiments, it is assumed that the client applications 106 of the user devices of the participating users are currently operatively connected to the server application 107 via the network 105 so as to receive the messages and data in a synchronous way.

In step C211, the client application 106 of the user device 104A allows the initiating user 101A to define a topic. The client application 106 of user device 104A obtains one or more media contents that will served as a topic TOP1 for the media content exchange. The one or more media contents to be used as a topic may be selected by user 101A among existing media contents or may be created by user 101A, for example as a result of a combination of existing contents or newly generated content (graphic, photo, etc). A media content used as a topic for a media content exchange will be noted topic media content(s) TMC1.

In step C212, once the one or more media contents TMC1 have been identified, the client application 106 sends to a server application 107 at least one request for registering the one or more identified media content TMC1 as a topic of a media content exchange.

The registering of a topic is further described by reference to FIG. 2D.

In at least one embodiment, on receipt of the registration request, the server application 107 registers the topic TOP1 by storing topic association data AST1 representative of the topic TOP1 and/or the topic media content TMC1. A user identifier of the initiating user may be stored with the topic association data AST1. A timestamp corresponding to the registration time may be stored for the topic association data AST1.

If a user group has been registered by the server application 107 for the media content exchange, using for example an embodiment of a method described by reference to FIG. 2A or 2B, the topic TOP1 is registered in association with the registered user group GR1.

In at least one embodiment, the server application 107 also registers the one or more identified media content to make the data file(s) encoding the topic media content TMC1 accessible from any user device 104A-104C of a participating user 101A-101C. For example, the topic media content(s) TMC1 are uploaded and stored on a remote media server to be accessible from a user device.

The registering of a topic media content TMC1 is further described by reference to FIG. 2G.

In step C213, one or more messages are sent by the server application 107 to the client application 106 of user devices of users participating to the media content exchange after registration of the topic TOP1. For example, the client application 106 of a user device of a participating user receives the one or more messages. The one or more messages comprise topic reproduction data, representative the topic and/or the topic media content, enabling a reproduction of the topic media content(s). The topic reproduction data may be based on or comprise a subset of or all of the topic association data AST1 registered in step C212. The topic reproduction data may comprise data file(s) encoding the topic media content and/or access data for accessing from a user device to the topic media content via a remote media server. The topic reproduction data may comprise a user identifier of the initiating user. The topic reproduction data may comprise a group identifier of a user group registered by the server application 107 for the media content exchange.

In step C214, on receipt of the one or more messages sent in step C213, the client application 106 of user device of a participating user is configured to access to the topic media content(s) TMC1 via a remote media server via which the topic media content(s) TMC1 has been made accessible at step C212, for example by downloading the data file(s) encoding the topic media content(s) TMC1. The client application 106 of user device of a participating user is configured to render a portion of and/or the whole topic media content TMC1 on a user interface of the user device of a participating user.

For example, at least one portion of the topic media content(s) is rendered by the client application 106 executing on a user device 104B or 104C. In at least one embodiment, a portion of the topic media content(s) TMC1 is selected by the user 101B or user 101C to be rendered. For example, the first part of a video content forming the topic media content(s) TMC1 will be displayed on a user interface of user device 104B or 104C.

In at least one embodiment, before, while or after the rendering of the topic media content(s) TMC1, the client application 106 displays the user identifier of the initiating user and/or a user identifier of one or more users participating to the media content exchange.

Step C214 may be repeated several times and/or may be executed after step C213 or after step C218.

In step C215, the client application 106 of user device of a participating user, for example user 101B or user 101A, allows the participating user to contribute to the media content exchange by selecting a portion of the topic media content and making a contribution to the topic of the media content exchange relatively to a selected portion of the topic media content. The client application 106 of user device of the contributing user obtains one or more media contents that will served as contribution to the topic of the media content exchange. The one or more media contents to be used as a contribution may be selected among existing media contents or may be created by user 101A, for example as a result of a combination of existing contents or newly generated content (graphic, photo, etc). A media content used as a contribution to a topic media content will be noted CMC11, CMC12, CMC21, etc.

In at least one embodiment, the client application 106 allows the contributing user to define rendering parameters for the selected portion of the topic media content(s) TMC1 and/or for the contribution media content(s) CMC11, CMC12. In at least one embodiment, the client application 106 allows the contributing user to define at least one logical dependency between two or more contribution media contents. The client application 106 obtains rendering parameters and/or logical dependency data representing the one or more logical dependencies.

Step C215 may be repeated several times and/or may be executed after step C214 or after step C212, C216 or C218.

In step C216, once the one or more contribution media content(s) CMC11, CMC12 have been identified, the client application 106 of user device of the contributing user sends to said server application at least one request for registering the contribution. In at least one embodiment, the request comprises an identification of the portion of the topic media content(s) TMC1 relatively to which the contribution has been made. In at least one embodiment, the identification comprise a rendering coordinate POV1 identifying the selected portion of the topic media content(s) TMC1.

In at least one embodiment, the request comprises the rendering parameters and/or logical dependency data obtained at step C215.

The registering of a contribution is further described by reference to FIG. 2E.

In at least one embodiment, on receipt of the registration request, the server application 107 registers the contribution by storing contribution association data ASC1 representative of the contribution.

In at least one embodiment, the contribution association data ASC1 represents an association between the selected portion of the topic media content(s) TMC1 and the selected contribution media content(s) CMC11, CMC12. A user identifier of the contributing user may be stored with the contribution association data ASC1. The contribution association data ASC1 may comprise the rendering parameters and/or logical dependency data obtained at step C215. A timestamp corresponding to the registration time may be stored for the contribution association data ASC1. In at least one embodiment, the contribution association data ASC1 are stored in association with the topic association data AST1 registered at step C212.

In at least one embodiment, the server application 107 also registers the one or more contribution media content(s) CMC11, CMC12 to make the data file(s) encoding the contribution media content(s) CMC11, CMC12 accessible from any user device 104A-104C of a participating user 101A-101C. For example, the contribution media content(s)

CMC11, CMC12 are uploaded and stored on a remote media server to be accessible from a user device.

The registering of a contribution media content is further described by reference to FIG. 2G.

In step C217, one or more messages concerning the contribution made in step C215 are sent by the server application 107 to the client application 106 of user devices of the users participating to the media content exchange. The one or more messages comprise contribution reproduction data, representative of the contribution, enabling a reproduction of the contribution on the target user device.

The contribution reproduction data may comprise an identification of the portion of the topic media content(s) TMC1 selected in step C215, for example a rendering coordinate POV1. The contribution reproduction data may be based on or may comprise a subset of or all of the contribution association data ASC1 registered in step C216. The contribution reproduction data may comprise data files encoding the contribution media content(s) CMC11, CMC12 and/or access data for accessing from a user device to the contribution media content(s) CMC11, CMC12 via a remote media server. The contribution reproduction data may comprise a user identifier of the contributing user. The contribution reproduction data may comprise a topic identifier of the topic TOP1 registered by the server application 107 at step C212. The contribution reproduction data may comprise the rendering parameters and/or logical dependency data obtained at step C215.

Step C217 may be repeated several times and/or may be executed after step C214 or after step C216.

In step C218, the client application 106 of user device of a participating user is configured to access to the contribution media content(s) CMC11, CMC12 via a remote media server via which the contribution media content(s) CMC11, CMC12 has been made accessible at step C216, for example by downloading the data file(s) encoding the contribution media content(s) CMC11, CMC12. The client application 106 is configured to reproduce one or more contributions made in step 215.

In at least one embodiment, the reproduction of a contribution is performed by rendering a combined media content resulting from a combination of at least one portion of the contribution media content(s) CMC11, CMC12 with the portion of the topic media content selected in step C215. In at least one embodiment the reproduction of one or more contribution is performed according to the rendering parameters and/or logical dependencies defined by the contributing user at step C215 and received at step C217.

In at least one embodiment, a portion of the topic media content(s) TMC1 and/or contribution media content(s) CMC11, CMC12 to be rendered is selected by the participating user.

In at least one embodiment, before, while or after the rendering of the contribution media content(s) CMC11, CMC12, the client application 106 displays the user identifier of the contributing user and/or a user identifier of one or more users participating to the media content exchange.

The reproduction of one or more contributions is further described by reference to 2F.

Step C218 may be repeated several times and/or executed after step C217 or after step C214 or C215.

Because the contribution media content(s) CMC11, CMC12 are downloaded on the user device 104A separately from the topic media content(s) TMC1, the combined media content has to be generated on the recipient user device 104A so as to reproduce the contribution on this user device 104A in the form in which this contribution has been made by the contributing user.

The main phases of the method comprise the definition of the topic (steps C211-212), the contribution to a topic (steps (C215-C216) and the reproduction of a contribution (steps C217-C218). Those different phases may be performed by the same instance of the client application 106 executing on the same user device for the same user or may be executed by different instances of the client application 106 executing on different user devices for the same users or for different users. For example, when the method is implemented in the context of a discussion group, the definition of the topic is performed by a first client application 106 for a first user, the contribution to the topic is performed by the first client application 106 for a first user and/or by a second client application 106 for a second user, the reproduction of the contribution is performed by the first or respectively second client application 106 for the first or respectively second user or by a third client application 106 for a third user. For example, when the method is implemented in the context of a service of a media content provider, the definition of the topic is performed by a first client application 106 for a first user, the contribution to the topic is performed by the first client application 106 for the first user, the reproduction of the contribution is performed by the first client application 106 for the first user or by a second client application 106 for a second user.

Depending on the context in which the media content is implemented (discussion group, social network, service of a media content provider, etc), the order in which the phases are implemented may be different are described above.

Figure 2D:
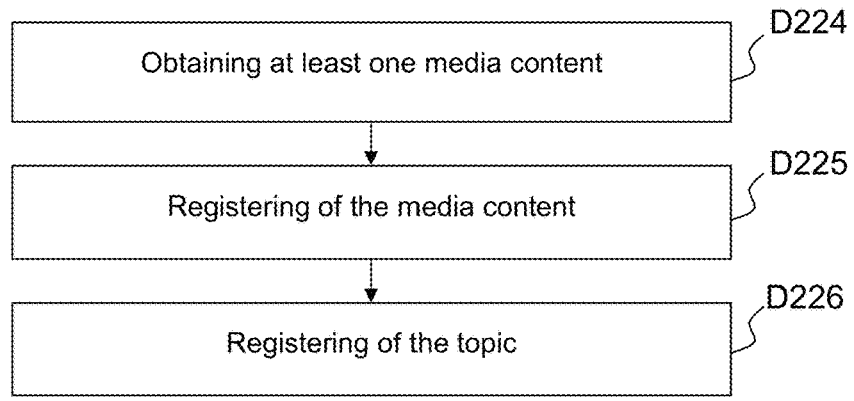

FIG. 2D illustrates an embodiment of a method for registering a topic. This method for registering a topic may be implemented in the context of a method for sharing media content between several users described by reference to FIG. 2C.

In step D224, one or more media content to be used as a topic for a media content exchange are obtained by client application 106 of user device 104A of an initiating user 101A. Those media contents may be automatically identified by the client application 106 or selected by the initiating user 101A. The user interface of the client application 106 may for example comprise at least one user interface item for selecting a media content. For example the user interface comprises a user interface item (button, menu, etc) for triggering the display of a user interface for searching, browsing and/or selecting one or more media contents.

Each selected media content may be a media content stored locally on user device 104A, a media content stored on a remote media server 103B (for example in a private cloud, a content delivery network, a media server in a private network etc.) which is not accessible by the other user devices of the participating user, a media content provided by a web application via a web server 103A, a media content provided by a source application executing locally on the user device 104A an which may only be accessed via said source application.

For example, the client application 106 may comprise a web browser, a browsing user interface for searching and selecting files and/or a typing zone enabling a user to enter a hypertext link (e.g. URL or URI) toward one or more files corresponding to the selected media content(s).

The client application 106 obtains at least one media content to be used as a topic for the media content exchange.

In step D225, the client application 106 of user device 104A sends to the server application 107 at least one request for registering the selected topic media content(s) TMC1. In one or more embodiment, the registering of the topic media content(s) TMC1 comprises the recording in the database 102D of a media content data set representing the topic media content(s) TMC1. The recorded media content data set comprises a media content identifier allocated by the server application 107 to the topic media content(s) TMC1 and/or access data for accessing to the topic media content(s) TMC1 from a user device via a remote media server 103A-103C.

Figure 2E:
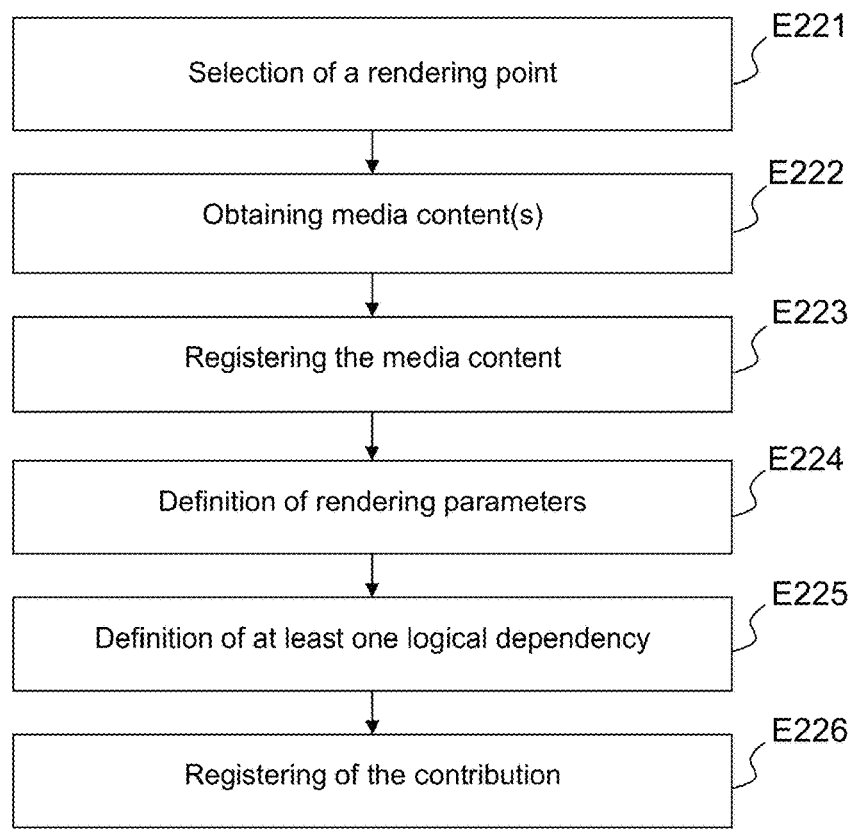
Figure 2F:
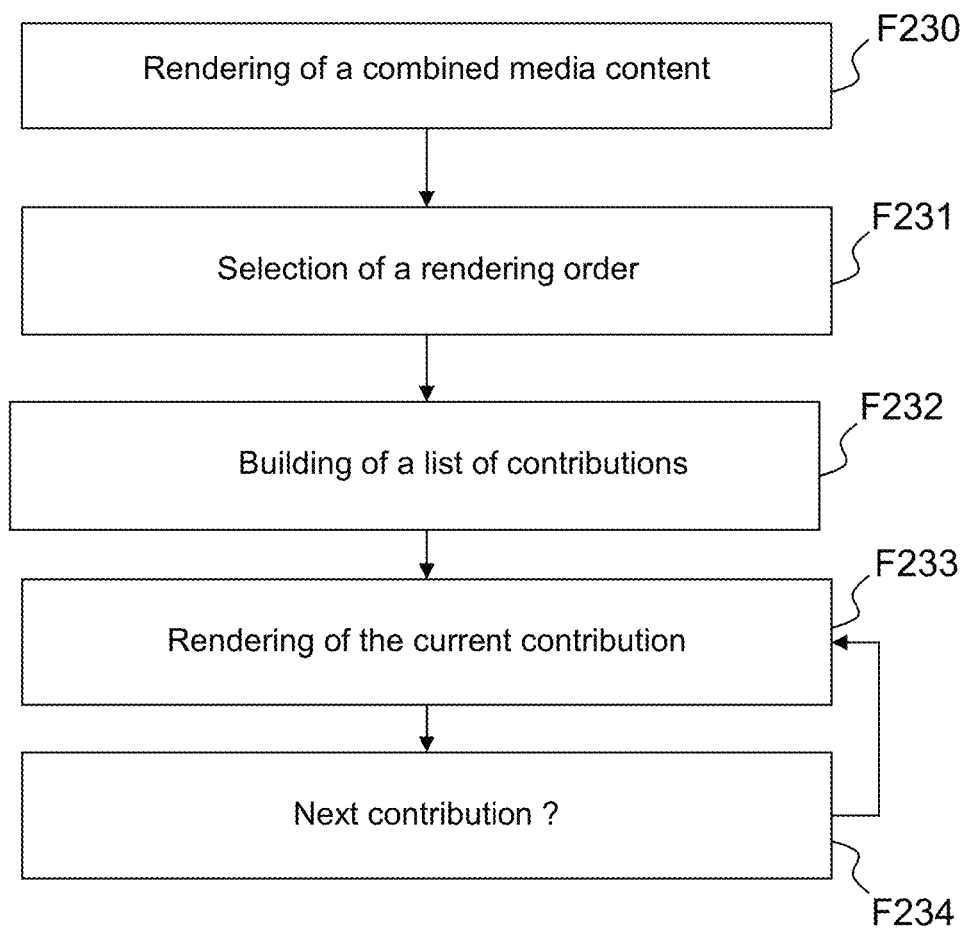
Figure 2G:
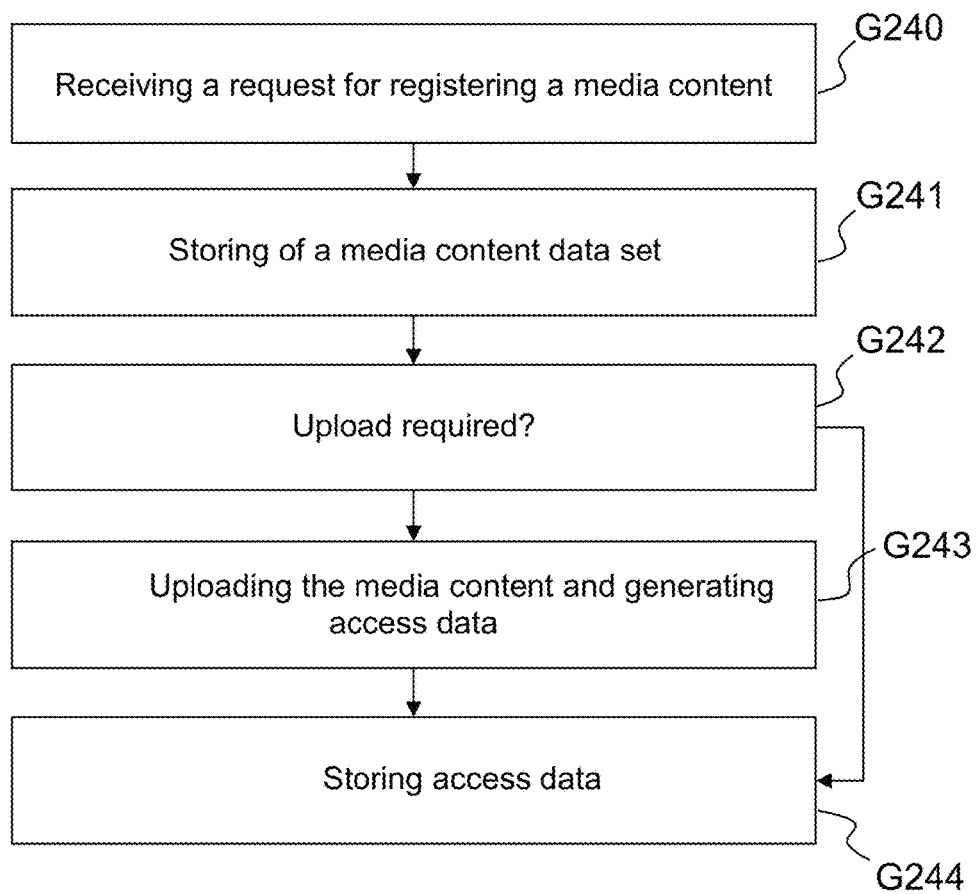

FIG. 2G illustrate an exemplary embodiment of a method for registering a media content which is applicable to a topic media content TMC1.

After registering of the topic media content(s) TMC1, the topic media content(s) TMC1 are accessible to the user device(s) 104A-104C of the participating users and may be downloaded or otherwise accessed by those user devices from a remote media server 103A or 103C.

In step D226, the client application 106 of user device 104A sends to the server application 107 at least one request for registering the topic media content(s) TMC1 selected in step D224 as a new topic TOP1 for the media content exchange. The topic TOP1 is registered by the server application 107 on server side, in the database 102D. In one or more embodiment the registering of the topic TOP1 comprises the allocation of a topic identifier to the topic TOP1 and the recording in the database 102D of a topic data set representing the topic TOP1. A timestamp corresponding to the time of registering is stored as the creation time for the topic data set.

In one or more embodiment the registering of the topic comprises the recording in the database 102D of topic association data AST1 representing an association between the topic media content(s) TMC1, the initiating user 101A, the user group GR1 and the topic TOP1. Alternatively, no topic data set is created and the registering of the topic TOP1 comprises the recording in the database 102D of topic association data AST1 representing an association between the topic media content(s) TMC1, the initiating user 101A and the user group GR1.

In one or more embodiment, when no user group has been registered for the media content exchange, the registering of the topic comprises the recording in the database 102D of topic association data AST1 representing an association between the topic media content(s) TMC1, the initiating user 101A and the topic TOP1. Alternatively, no topic data set is created and the registering of the topic TOP1 comprises the recording in the database 102D of topic association data AST1 representing an association between the topic media content(s) TMC1 and the initiating user 101A.

Figure 3B:
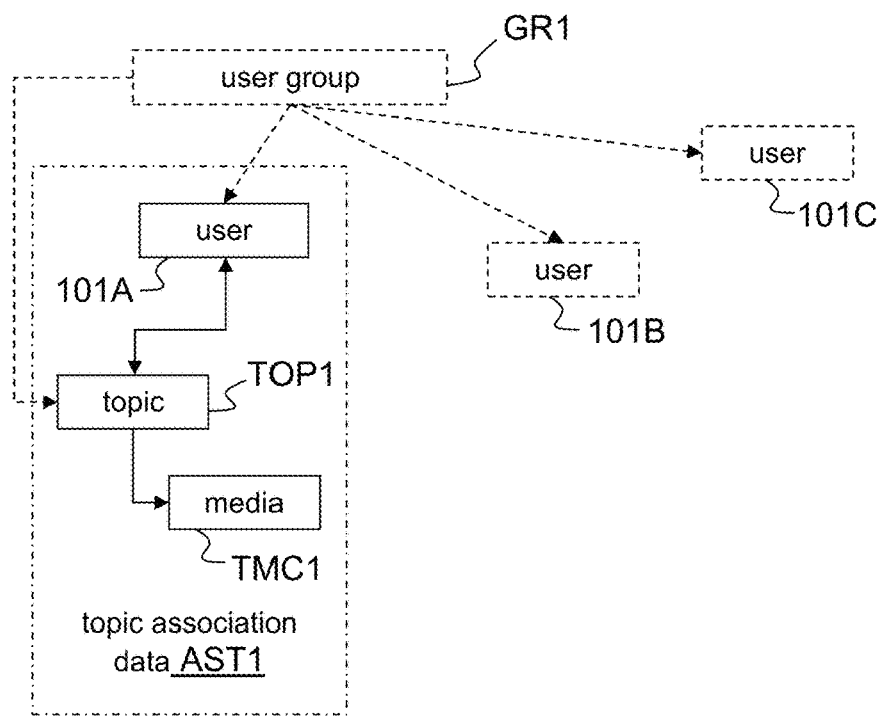

For example, as represented schematically by the entity-relationship diagram of FIG. 3B, the topic data set representing the topic TOP1 is stored in association with the user group data set representing the user group GR1, with the content data set(s) representing the topic media content TMC1 and with the user data set representing the initiating user 101A. Alternatively, no topic data set is created and the user group data set representing the user group GR1 is stored in relationship with the content data set(s) representing the topic media content TMC1 and with the user data set representing the initiating user 101A. Alternatively, no topic data set and no user group data set is created, and the content data set(s) representing the topic media content TMC1 is stored in relationship with the user data set representing the initiating user 101A.

In step D227, the server application 107 sends to each client application 106 executing on the user devices 104B-104C of the users participating to the media content exchange, one or more messages relatively to the newly defined topic.

In one or more embodiments, the one or more messages comprise topic reproduction data concerning the topic of the media content exchange. The topic reproduction data may be generated on the basis of the topic association data AST1 registered in step D225 or D226 by the server application 107 for representing the topic TOP1 and/or the topic media content(s) TMC1. For example, the topic reproduction data comprise a subset of these topic association data AST1. In at least one embodiment, the topic reproduction data comprise a user identifier of the initiating user 101A having initiated the media content exchange, a user identifier of at least one user participating to the media content exchange and/or access data for accessing to the topic media content(s) TMC1 from any of the user device 104A-104C.

For example, when the topic media content(s) TMC1 is accessible via the media server 103C, the access data may include the content identifier allocated to the topic media content(s) TMC1 by the server application 107 in step D225. The content identifier may be used to request or download from a remote media server 103A or 103C the one or more topic media contents TMC1.

In step D228, the client application 106 executing on a user device of a participating user receives and processes the one or more messages sent in step D227. The processing may comprise a download of at least one portion of a topic media content(s) TMC1 from a remote media server 103A or 103C to the user device of a participating user using the access data included in the one or more messages sent in step D227.

FIG. 2E illustrates one embodiment of a method for registering a contribution of a user to a topic. The method for registering a contribution may be implemented in the context of a method for sharing media content between several users described by reference to FIG. 2C.

In step E221, a portion of the topic media content TMC1 is selected. The selected portion may be a portion associated with an existing contribution, which portion has thus already been selected by a contributing user or may be a newly selected portion.

The user interface of the client application 106 of user device 104B may comprise at least one user interface item for navigating into the topic media content(s) TMC1, for selecting the rendering point POV1 (or point of view) for the topic media content TMC1 or for inputting a rendering coordinate identifying the rendering point POV1 relatively to a rendering coordinate system associated with the topic media content TMC1. In one or more embodiment, the corresponding rendering point POV1 is computed for the topic media content TMC1 relatively to at least one axis of a rendering coordinate system associated with the topic media content TMC1.

In step E222, the client application 106 of user device 104B obtains one or more media content CMC11, CMC12 that forms a contribution of a contributing user 101B to the topic TOP1.

The user interface of the client application 106 of user device 104B may for example comprise at least one user interface item for generating and/or selecting one or more media content CMC11, CMC12. For example the user interface may comprise a user interface item (button, menu, etc.) for triggering the display of a user interface for searching and/or selecting one or more media contents. For example the user interface comprise a toolbar for generating or importing a contribution media content. For example, the user interface may be configured with a media content editor to enable the user to:
- draw a graphic content including rectangles, circles, or other predefined geometric forms or a free form,
- write a text,
- insert a dynamic link like for example an URL or a hash tag,
- import an image/video/audio/text content,
- apply a filter to an image or audio content,
- generate an image/video/audio/text content by means of a camera and or microphone;
- edit an existing media content.

In step E223, the client application 106 of user device 104B sends to the server application 107 at least one request for registering the selected/generated contribution media content(s) CMC11, CMC12. In one or more embodiment the registering of the contribution media content(s) CMC11, CMC12 comprises the recording in the database 102D of one or more media content data set(s) representing the contribution media content(s) CMC11, CMC12. Each recorded media content data set comprises a media content identifier allocated by the server application 107 to a corresponding contribution media content(s) CMC11, CMC12 and/or access data for accessing to corresponding topic media content(s) CMC11, CMC12 from a user device via a remote media server 103A-103C. FIG. 2D illustrates an exemplary embodiment of a method for registering a media content which is applicable to a contribution media content.

After registering of the contribution media content(s) CMC11, CMC12, the contribution media content(s) CMC11, CMC12 are accessible to the user device(s) 104A-104C of the users participating to the media content exchange and may be downloaded or otherwise accessed by those user devices 104A-104C from a remote media server 103A or 103C.

In step E224, the client application 106 allows user device 104B to define at least one rendering parameter RP11, RP12 for the contribution media content(s) CMC11, CMC12 and/or define at least one rendering parameter RP1 for the topic media content(s) TMC1. A rendering parameter RP1, RP11, RP12 defines how a contribution media content and/or a topic media content has to be rendered on the user device of another user, i.e. recipient user, participating to the same media content exchange. A rendering parameter may be a combination parameter CP11, CP12, a filtering parameter FP1, FP11, FP12, a rendering order parameter RO1.

A combination parameter CP11, CP12 may define how a contribution media content CMC11, CMC12 has to be combined with a topic media content in order to form an annotation of that topic media content.

A combination parameter CP11, CP12 may be a spatial combination parameter defining a location in a two dimensional coordinate system associated with a topic media content TMC1, where the contribution media content CMC11, CMC12 has to be displayed. For example, a contribution media content CMC11, CMC12 which is a picture or a logo may be positioned at different location in an image of a topic media content TMC1 which is a video or image content. In this example, the spatial combination parameter is a couple (x,y) of coordinates corresponding to the horizontal and vertical position of the contribution media content CMC11, CMC12 in an image of a topic media content TMC1.

A combination parameter CP11, CP12 may be a transparency parameter defining the transparency of an image-based contribution media content relatively to an image-based topic media content. In this example, the transparency parameter is a value coded between a minimum transparency value (no transparency) and a maximum transparency value coordinates (fully transparent contribution media content).

A combination parameter CP11, CP12 may be a weight defining the weight of an image-based (respectively audio-based) contribution media content relatively to an image-based (respectively audio-based) based topic media content, the combined media content being a weighted sum (pixel by pixel for image-based content or respectively, sample by sample for audio-based content).

A combination parameter CP11, CP12 may be a temporal combination parameter defining a synchronization mode between the topic media content TMC1 and the contribution media content CMC11, CMC12 according to which the two contents have to be combined and rendered.

For example, different synchronization modes may be predefined and selected by the contributing user 101B: a freeze mode and a flow mode.

When the freeze mode is selected, the rendering of the topic media content will be interrupted when the rendering point POV1 defined by the contributing user in step E221 will be reached and the rendering of the topic media content(s) TMC1 will be frozen with the corresponding portion of the topic media content while the contribution media content is rendered. The freeze mode is useful for example when one wants to add a video contribution on a specific image of a topic video media content: a frozen image corresponding to the rendering point POV1 may be displayed while the contribution media content is displayed.

When the flow mode is selected, the rendering of the topic media content will continue and not be interrupted when the rendering point POV1 defined by the contributing user in step E221 will be reached. For example when a topic media content is a video and the contribution media content is also a video, both video will be displayed simultaneously.

A filtering parameter FP1, FP11, FP12 may define a filter (or effect) to be applied to a contribution media content (e.g. the filtering parameter FP11, respectively FP12 applied to the contribution media content CMC11, respectively CMC12) and/or a topic media content (e.g. the filtering parameter FP1 applied to the topic media content TMC1) before being rendered on the user device of a recipient user. For example, a filter applied to a topic media content which is an image or a video may be a color enhancement filter, a contrast enhancement filter, a colorimetry modification filter, a sharpening filter, a smoothing filter, deformation filter, etc.

A filtering parameter FP1 which is defined by a contributing user making a contribution to a topic, is used to define a filter to be applied to the portion of the topic media content relatively to which the contribution has been made. The reproduction of the contribution on the user device of a recipient user is performed according to the filtering parameter defined by the contributing user.

A rendering order parameter RO1 is used to define in which order the contribution media contents relatively to a topic media content have to be rendered on the user device of a recipient user. For example, different rendering orders RO1 may be predefined and selected by the contributing user 101B: a chronological order, a rendering coordinate-based order, a user-based order, and a dependency-based order.

The chronological order allows to render the contribution media content in the order of their creation on the basis of the recorded timestamp stored for the associated rendering point data set. A timestamp may be generated by a universal clock and is thus relative to a temporal axis of the real world. This temporal axis may be said to be the temporal axis of the discussion thread in the context of the discussion group.

The rendering coordinate-based order allows to render the contribution media content in the order of their rendering point on the basis of the recorded rendering coordinate(s) stored in the rendering point data set. For example, when the rendering point is an image number relatively to a topic media content which is a video content, the different contribution media contents may be rendered by image number order. Said in another way, the temporal axis of the video content is used to determine the contribution media content order instead of the temporal axis of the discussion thread. For example, the video content may be rendered from the beginning to the end and by rendering a contribution media content when an image number corresponding to a rendering coordinate is reached.

The user-based order allows to render contribution media contents depending on the contributing user. For example, in one embodiment, when the user-based is selected, allows to render all contribution media contents of a first user are rendered first, then all contribution media contents of a second user, etc. In one embodiment, when the user-based order is selected all contribution media contents of a given user are rendered in a chronological order (i.e. on the basis of their timestamp) or in rendering coordinate-based order (i.e. on the basis of the value of the rendering coordinate).

The dependency-based order allows to render the contribution media contents in dependence upon the logical dependencies defined between the contribution media contents. For example, the dependency-based order allows to render a first registered contribution media content, then a second registered contribution media content having a logical dependency with the first registered contribution media content, then a third registered contribution media content having a logical dependency with the second registered contribution media content, and so and, by following the dependency chain(s) between the contribution media contents. In one embodiment, when the dependency-based order is selected all contribution media contents of a given dependency chain are rendered in a chronological order (i.e. on the basis of their timestamp) or in rendering coordinate-based order (i.e. on the basis of the value of the rendering coordinate).

In step E225, when user device 104B is not the first user contributing to the media content exchange and at least one previous contribution has already been registered by server application 107 for that media content exchange, the client application 106 allows user device 104B to select a previously registered contribution media content and to create a logical dependency between the current contribution media content(s) CMC11, CMC12 and the previously registered contribution media content. A logical dependency is used to define a dependency between contribution media contents. This allows a contributing user 101B to indicate to which media content(s) his contribution relates. This also allows to define subset of contribution media contents having a logical dependency. This subset of contribution media contents may for example correspond to a sub-topic of the topic TOP1 of the media content exchange.

In step E226, the client application 106 of user device 104B sends to the server application 107 at least one request for registering contribution association data ASC1 representative of the contribution to the media content exchange. In one or more embodiment the contribution association data ASC1 comprise an identification of the portion of the topic media content(s) TMC1 to which the contribution relates. In at least one embodiment, the identification of the portion of the topic media content(s) TMC1 comprises the rendering coordinate defining the rendering point POV1.

Optionally, the contribution association data ASC1 also comprise one or more rendering parameters RP1, RP11, RP12 specified by the contributing user 101B and obtained by the client application 106 of user device 104B at step E224. Optionally, when at least one logical dependency has been defined at step E225, the contribution association data ASC1 also comprise logical dependency data LD1 representing the logical dependency. For example, the logical dependency data LD1 comprise a content identifier of the previously registered contribution media content to which the logical dependency applies.

The server application 107 registers the contribution of user 101B on server-side, for example in the database 102D. In one or more embodiment the registering of the contribution of user 101B comprises the recording in the database 102D of a rendering point data set representing the rendering point POV1 and comprising the rendering coordinate obtained in step E224. A timestamp corresponding to the time of registration is stored as creation time of the rendering point data set. This timestamp is the timestamp of the contribution of user 101B.

Optionally, when one or more combination parameters CP11, CP12 have been defined in step E224, those combination parameters CP11, CP12 are also stored in association with the content data set representing the contribution media content CMC11, CMC12 to which the combination parameter CP11, CP12 have to be respectively applied.

Optionally, when one or more filtering parameters FP1, FP11, FP12 have been defined in step E224, those filtering parameters FP1, FP11, FP12 are also stored in association with the rendering point data set representing the portion of the topic media content to which the filtering parameters FP1, FP11, FP12 have to be respectively applied.

Optionally, when one or more logical dependencies have been defined in step E225, logical dependency data LD1 are stored. For example, the content identifier of the previously registered contribution media content is stored in association with the content data set representing the contribution media content having a logical dependency with the previously registered contribution media content.

Optionally, when several contributions have been made by different users participating to the media content exchange, the client application 106 is configured to allow the contributing user to select a rendering order RO1 parameter to determine in which order the different contributions have to be rendered on the user device of a recipient user. This render order parameter may be used by a recipient user for rendering the different contributions.

In one or more embodiment the registering of the contribution of user 101B comprises the recording in the database 102D of contribution association data ASC1 representing an association between the contribution media content(s) CMC11, CMC12 and the portion of the topic media content(s) TMC1 identified by the rendering point POV1. In one or more embodiment, the contribution association data ASC1 further comprise at least some of the rendering parameters RP1, RP11 (combination parameters CP11, CP12 and/or filtering parameters FP1, FP11, FP12 and/or rendering order RO1) defined in step E224 and/or the logical dependency data LD1 representing the logical dependencies defined in step E225.

In at least one embodiment the contribution association data ASC1 represents an association between the contribution media content(s) CMC11, CMC12, the rendering point POV1, the contributing user 101B and the topic TOP1. Alternatively, when to topic data set has been created, the contribution association data ASC1 represent an association between the contribution media content(s) CMC11, CMC12, the rendering point POV1, the contributing user 101B and the topic media content(s) TMC1.

Figure 3C:
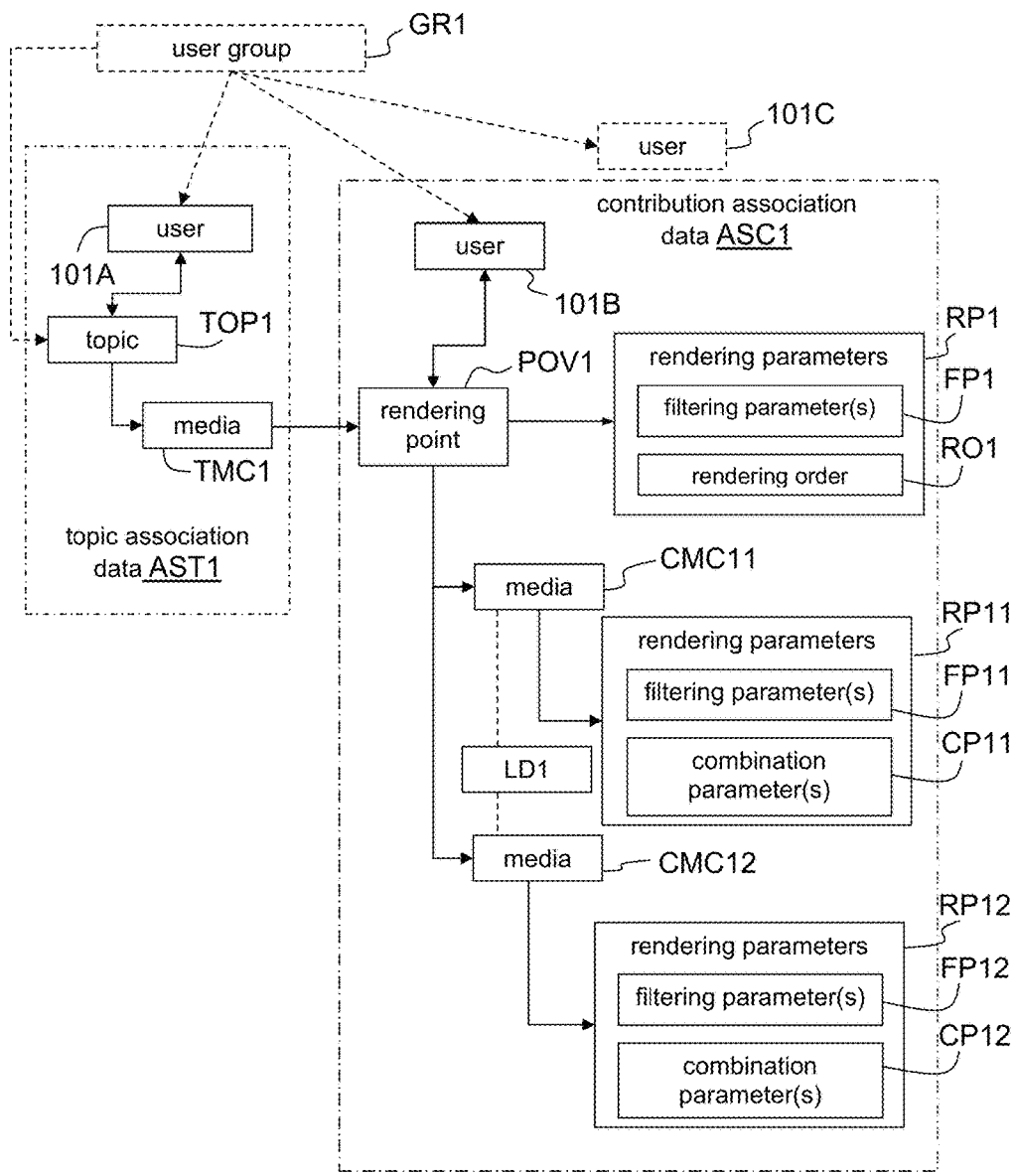
Figure 3D:
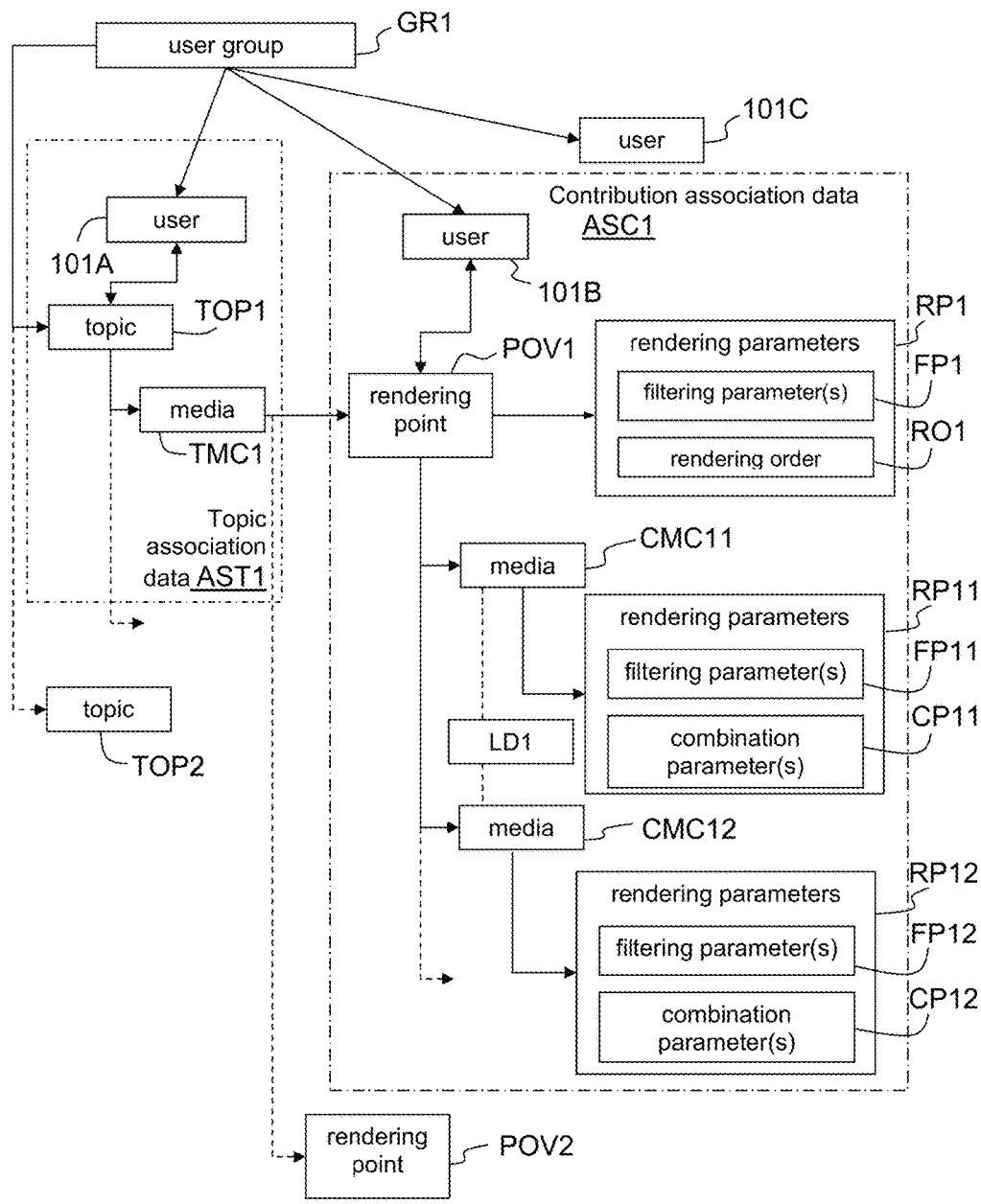

For example, as represented schematically by the entity-relationship diagram of FIG. 3C, the rendering point data set representing the rendering point POV1 is stored in association with the different content data sets representing the contribution media contents CMC11, CMC12 (comprising in this example two contribution media contents CMC11, CMC121 and CMC11, CMC122), with the topic data set representing the topic TOP1 and with the user data set representing the contributing user 101B. In this schematic representation, the contribution association data ASC1 comprise the rendering parameters RP1, RP11, RP12, i.e. the combination parameters CP11, CP12, the filtering parameters FP1, FP11, FP12 and the rendering order RO1.

Alternatively, when no topic data has been created, the rendering point data set representing the rendering point POV1 is stored in association with the different content data sets representing the contribution media contents CMC11, CMC12, with the media content data set(s) representing the topic media content(s) TMC1 and with the user data set representing the contributing user 101B.

Optionally, when one or more filtering parameters FP1, FP11, FP12 have been defined in step E224, the rendering point data set representing the rendering point POV1 is stored in association with the filtering parameters FP1, FP11, FP12 defined in step E224.

Optionally, when one or more combination parameters CP11, CP12 have been defined in step E224, the content data set representing a contribution media content CMC11, CMC121 or CMC11, CMC122 is stored in association with the combination parameters CP11 or CP12 defined in step E224 that apply respectively to the contribution media content CMC11, CMC121 or CMC11, CMC122.

The contribution association data ASC1 may be generated and stored in various ways. The function of the contribution association data ASC1 is to encode the relationship between a contribution and a topic so as to enable a reproduction of the contribution made by a user on sole the basis of this contribution association data ASC1, of access data to the contribution media content(s) CMC11, CMC12 and of access data to the topic media content(s) TMC1, especially without requiring that the server application 107 sends to each user device of a user participating to the media content exchange a combined media content resulting from the combination of the contribution media content(s) CMC11, CMC12 and the topic media content(s) TMC1. Network bandwidth may thus be saved as the different media contents may be downloaded once on each user device, and then combined as necessary with the topic media content(s) TMC1 for reproducing a contribution or several contributions. For example, when the topic media content(s) TMC1 comprise a video content, this video content will be downloaded only once on the different user devices of the participating user and not for each contribution made relatively to that video content.

FIG. 2F illustrates one embodiment of a method for reproducing contribution(s) related to a topic of a media content exchange. The method may be performed after the registration of a contribution, for example after steps C215-C216 and/or after steps E221-E226.

In step F230, the client application 106 executing on the user device of user participating to a media content exchange is configured to receive contribution reproduction data concerning a contribution made relatively to a topic media content of the media content exchange. As described by reference to step C217 of FIG. 2C, the contribution reproduction data comprises an identification of a selected portion of the topic media content TMC1 relatively to which the contribution has been made.

The client application 106 is configured, for each contribution, to render a combined media content resulting from a combination of at least one portion of the contribution media content CMC11, CMC12 with the selected portion of the topic media content TMC1.

When rendering parameters (combination parameters and/or filtering parameters, and/or rendering order) and/or logical dependency data defined in step E224-E225 or C215 are transmitted with the contribution reproduction data, the combination is performed by client application 106 executing on the user device 104A according to one or more received rendering parameters RP1 defined for the topic media content(s) TMC1 and/or the rendering parameters RP11, RP12 defined for the contribution media content CMC11, CMC12.

The combination may correspond to a weighted sum of video and/or audio content, a superposition of images or graphics, a (spatial) juxtaposition of images or graphics, (temporal) concatenation of video or audio content, convolution of contents, an incrustation of thumbnail of the contribution content into at least one image of the topic media content, etc.

In at least one embodiment, the combination is performed by generating a combined topic media content resulting from a combination of at least one portion of the contribution media content CMC11, CMC12 with a portion of the topic media content TMC1 corresponding to the received rendering coordinate POV1. In at least one embodiment, the generation of the combined topic media content is performed "on the fly" by the client application 106, that is to say in a RAM memory of a user device for the sole purpose of the rendering of this combined media content via a user interface of a user device. In particular, no media content data file comprising the combined media content needs therefore to be stored in a permanent way on the user device.

For example, as illustrated by FIGS. 6C-6F, when the topic media content is a video or an image and the contribution media content is an image or a graphic, one or more pixels of the topic media content may be, in the combined media content generated, replaced by a pixel of the contribution media content or by a combination of a pixel of the topic media content and the corresponding pixel of the contribution media content. A combination of pixels may be for example computed as a weighted sum of the two pixels, the weights enabling to adjust the transparency of the contribution media content relatively to the topic media content.

When a contribution media content is an audio content and the topic media content is also an audio media content, the combination of the two contents may be computing by mixing the audio samples with predefined or user-defined respective weights.

The client application 106 executing on the user device 101A is configured to render the combined media content resulting from the combination. The user 101A can thus view and/or list the contributions of the different users participating to the media content exchange.

The amended topic media content may be generated and stored in a dynamic memory of user device 104A and never be saved on a permanent storage medium of the user device 104A. Thus the combined media content is generated by the client application 106 on a user device for the purpose of the rendering of this combined media content on that user device, but this combined media content needs not to be permanently stored on that user device or to be transmitted through the network 105.

As a consequence, only the unmodified topic media content(s) and unmodified the contribution media content(s) need to be transmitted (e.g. downloaded) to a user device. This transmission of the unmodified media content(s) need to be performed only once, which reduces the network bandwidth necessary for content transmission compared to a situation where a combined media content would have been transmitted to each user device each time a contribution is made.

In step F231, when several contributions have been made by different users participating to the media content exchange, the client application 106 executing on the user device of user 101A is configured to allow a user to select a rendering order parameter to determine in which order the different contributions have to be rendered. The rendering order parameter selected in step F231 by a recipient user may be identical to or different from the rendering order RO1 defined by a contributing user in step E224 or C215.

In step F232, the client application 106 executing on the user device of user 101A is configured to generate an ordered list of contributions according to the rendering order selected in step F231. The first contribution in the list of contributions is selected as the current contribution.

In step F233, the client application 106 executing on the user device 101A is configured to render a combined media content resulting from the combination of the topic media content(s) TMC1 and of the contribution media contents of the current contribution selected in the list of contributions generated in step F232.

In step F234, the client application 106 executing on the user device of user 101A is configured to select the next contribution in the list of contributions generated in step F232. Step F233 is executed after step F233 with the newly selected contribution. Step F234 is performed until all the contributions of the contribution list have been rendered or until the client application 106 receive a command to stop the rendering.

The user 101A can thus view and/or list the contribution of the different users to the media content exchange.

Figure 4:
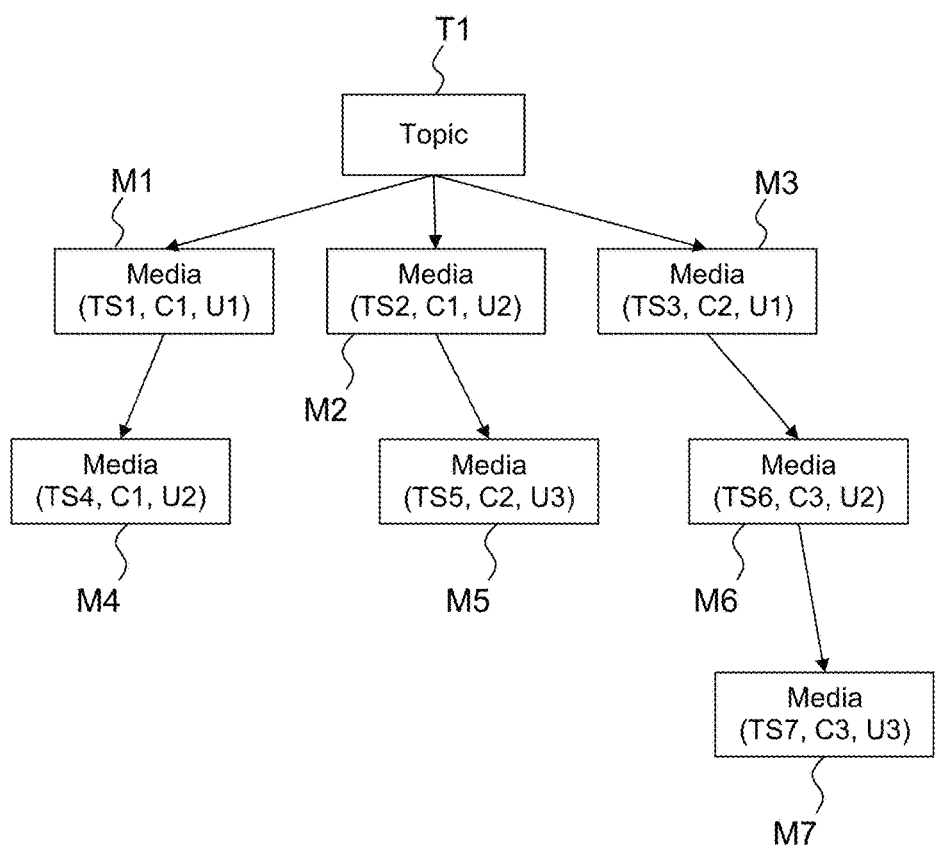
FIG. 4 represents schematically an example of a dependency graph that illustrates one embodiment.

FIG. 4 illustrates the different rendering order possibilities by a representation of an exemplary dependency tree between media contents related to a media content exchange. In the example, the media content exchange comprises a topic media content T1, and contribution media contents M1 to M7. For each contribution media content, a timestamp, a rendering coordinate, a contributing user and, optionally, a logical dependency with another contribution media content are defined. In this example, the following contributions have been successively made to the media content exchange:

Media M1 forms a contribution of user U1, at timestamp TS1, for rendering coordinate C1, without logical dependency with another contribution media content and is noted M1(TS1, C1, U1);

Media M2 forms a contribution of user U2, at timestamp TS2, for rendering coordinate C1, without logical dependency with another contribution media content and is noted M2(TS2, C1, U2);

Media M3 forms a contribution of user U1, at timestamp TS3, for rendering coordinate C2, without logical dependency with another contribution media content and is noted M3(TS3, C2, U1);

Media M4 forms a contribution of user U2, at timestamp TS4, for rendering coordinate C1, with a logical dependency to Media M1 and is noted M4(TS4, C1, U2);

Media M5 forms a contribution of user U3, at timestamp TS5, for rendering coordinate C2, with a logical dependency to Media M2 and is noted M5(TS5, C2, U3);

Media M6 forms a contribution of user U2, at timestamp TS6, for rendering coordinate C3, with a logical dependency to Media M3 and is noted M6(TS6, C3, U2);

Media M7 forms a contribution of user U3, at timestamp TS7, for rendering coordinate C3, with a logical dependency to Media M6 and is noted M7(TS7, C3, U3).

When a user selects the chronological order, the contribution media contents will be rendered in this order: M1, M2, M3, M4, M5, M6, M7.

When a user selects the rendering coordinate-based order, the contribution media contents will be rendered in this order: M1, M2, M4, M3, M5, M6, M7, by using the chronological order for the contribution media contents of a same rendering coordinate.

When a user selects the user-based order, the contribution media contents will be rendered in this order: M1, M3, M2, M4, M6, M5, M7, by using the chronological order for the contribution media contents of a same user and for classifying the users.

When a user selects the dependency-based order, the contribution media contents will be rendered in this order: M1, M4, M2, M5, M3, M6, M7, by using the chronological order for the contribution media contents of a same dependency chain and for classifying the dependency chains.

FIG. 2G illustrates one embodiment of a method for registering a media content(s) of a media content exchange. This method is applicable to a topic media content or to a contribution media content. This method is applicable to a media content stored locally on user device 104A-104C, a media content stored on a remote media server 103A-103B, a media content provided by a web application via a web server 103A, a media content provided by a source application executing locally on the user device 104A.

The source application is for example the software application Plans® developed by Apple®. The source application is a software application or a software application component which is configured to provide media content (e.g. an image, a 3D image, a video, a geographic map, a street view, etc.) corresponding to a set of at least one input parameter (which is in present example, is a geographical position in a localization zone).

In step G240 G24, the server application 107 receives from a requesting user device, for example user device 104B, at least one request for registering a media content (topic media content or contribution media content).

The request comprises access information on the media content to be registered. For example, the request comprises a link to the media content, a local access path relatively to storage medium of the requesting user device, a universal resource locator (URL), a universal resource indicator (URI), a source application identification, a server identification, or any other parameter or information in any form that may be used to locate and access to the media content data.

In step G241, the server application 107 stores in the database 102D a media content data set representing the media content. The recorded media content data set comprises a media content identifier allocated by the server application 107 to the media content.

In step G242, the server application 107 determines whether the media content has to be uploaded to the media server 103C in order to be made accessible from any user device 104A-104C. In at least one embodiment, the media content has to be uploaded to the media server media server 103C when the media content is, before the registering, not yet accessible from any user device 104A-104C in a permanent way. For example, a media content stored locally on the requesting user device has to be uploaded. For example, a media content stored which is a temporary web content on a web server has to be uploaded or a representation of that temporary web content has to be uploaded. For example, a media content provided by a source application does not have to be uploaded if this source application can be executed on any user device 104A-104C for accessing to the media content.

In step G243, when it has been determined in step G242 that the media content needs to be uploaded, the server application 107 sends a command to the requesting user device 104B for uploading the media content to the media server 103C. The media content is uploaded and stored by the media server 103C. Access data corresponding to the location of the media content on the media server 103C are generated and stored in the media content data set representing the media content. Those access data allows to access to the media content data from a user device via the remote media server 103C.

In step G244, when it has been determined in step G242C1 that the media content needs not to be uploaded, the server application 107 stores access data corresponding to the location of the media content in the media content data set representing the media content. Those access data correspond to the access information received from the requesting user device 104B. Those access data may comprise an identification of a content source and/or parameters for accessing to the media content via a content source. For example, those access data comprise a hypertext link to a web page, a universal resource locator (URL), a universal resource indicator (URI), a source application identification, a server identification, or any other parameter required for accessing to the media content data via a source application or respectively via a media server distinct from the remote media server 103C. In the case of a media content provided by a source application the access data may comprise an identification of the source application and at least one application parameter identifying the topic media content, to be used for obtaining the topic media content from the source application. In the case of a web page provided by a web server, the access data may comprise a hypertext link to said web page via said web server.

After registering of the media content, the media content is accessible to the user device(s) 104A-104C of the users participating to the media content exchange and may be downloaded or otherwise accessed by those user devices from at least one media server or source application.

Figure 5A:
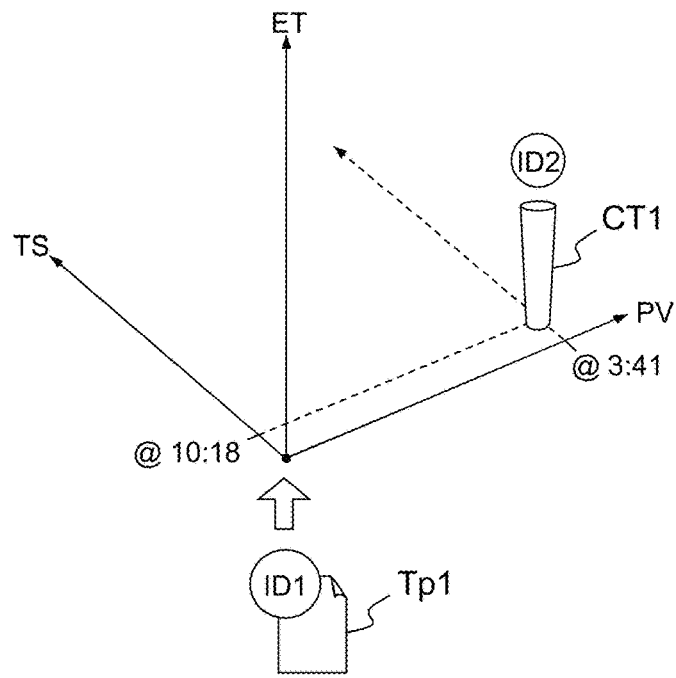
FIG. 5A-5C illustrate graphically some aspect of the invention according to at least one embodiment.
Figure 5B:
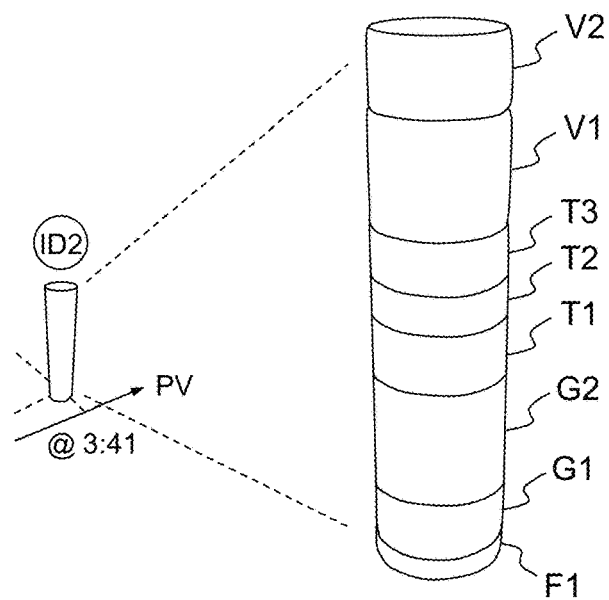
Figure 5C:
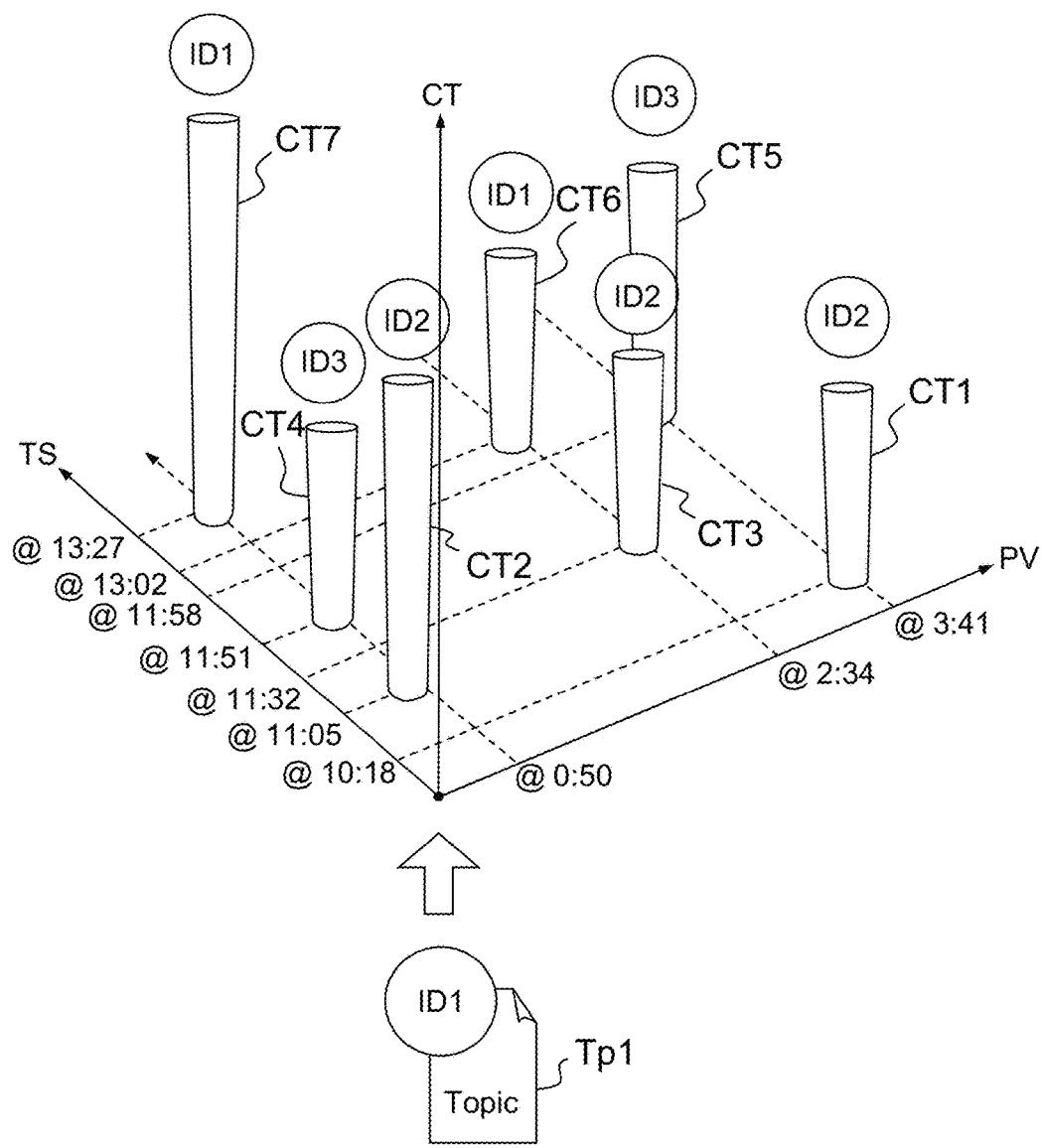

FIG. 5A-5C illustrates by a representation in a three dimensional space the media contents related to a media content exchange and their relative relationships.

This three dimensional space comprises three axis.

The first horizontal axis PV is an axis representing a point of view, or more generally a rendering point, on the topic media content. In the example illustrated by FIG. 5A, the PV axis represents the temporal axis of the topic media content relatively to which a rendering coordinate, i.e. timecode, may be defined.

The second horizontal axis TS is an axis representing the temporal axis (i.e. the time in the real world) of the discussion. The TS axis represents for example timestamp values associated to the topic media content and contribution media contents.

The third axis CT is an axis representing the contributions.

The topic of the media content exchange is by convention represented by the origin of the three axis system.

FIG. 5A corresponds to a media content exchange comprising a topic TP1 and a contribution CT1. As represented by FIG. 5A:
- at timestamp 00:00 the topic TP1 has been defined by a user whose user identifier is ID1; this topic TP1 is for example a video content; and
- at timestamp 10:18 a contribution CT1 has been defined by a user whose user identifier is ID2 for the portion of the topic TP1 corresponding to the timecode @3:41 defining a point of view on the topic TP1, e.g., for the image of the topic TP1 corresponding to the timecode @3:41.

As represented by FIG. 5B, a contribution at timecode @3:41 may be defined by different media contents and a filter (F1) to be applied to a portion of the topic TP1 corresponding to the point of view defined for that contribution. In the example of FIG. 5B, the media contents comprises:
- a first graphic content (G1),
- a second graphic content (G2),
- a first text content (T1),
- a second text content (T2),
- a third text content (T3),
- a first video content (V1), and
- a second video content (V2).

The order in which the media contents are represented in FIG. 5B is representative of the order in which those media contents have to be combined for rendering the combined media content resulting from a combination of the contribution media contents with the portion of the topic media content corresponding to the point of view. In the example of FIG. 5B:
- first, a filter F1 is applied to the image of the topic TP1 corresponding to the timecode @3:41;
- then a first combination is performed by combining (for example superposing) the graphic content G1 with the filtered image;
- then a second combination is performed by combining (for example superposing) the image resulting from the first combination with the graphic content G2;
- then a third combination is performed by combining (for example superposing) the image resulting from the second combination with the text content T1;
- then a fourth combination is performed by combining (for example superposing) the image resulting from the third combination with the text content T2;
- then a fifth combination is performed by combining (for example superposing) the image resulting from the fourth combination with the text content T3;
- then a sixth combination is performed by combining (for example juxtaposing) the image resulting from the fifth combination with the video content V1;
- then a seventh combination is performed by combining (for example juxtaposing) the video content resulting from the sixth combination with the video content V2.

FIG. 5C corresponds to a media content exchange comprising a topic TP1 and several contribution CT1 to CT7. As represented by FIG. 5C:

at timestamp 00:00 the topic TP1 has been defined by a user whose user identifier is ID1; this topic TP1 is for example a video content;

at timestamp 10:18 a contribution CT1 has been defined by a user whose user identifier is ID2 for the portion of the topic TP1 corresponding to the timecode @3:41 defining a point of view on the topic TP1, e.g., for the image of the topic TP1 corresponding to the timecode @3:41; and similarly, at timestamp 11:05 a contribution CT2 has been defined by a user whose user identifier is ID2 for the image of the topic TP1 corresponding to the timecode @0:50;

at timestamp 11:32 a contribution CT3 has been defined by a user whose user identifier is ID2 for the image of the topic TP1 corresponding to the timecode @2:34;

at timestamp 11:51 a contribution CT4 has been defined by a user whose user identifier is ID3 for the image of the topic TP1 corresponding to the timecode @0:50;

at timestamp 12:58 a contribution CT5 has been defined by a user whose user identifier is ID3 for the image of the topic TP1 corresponding to the timecode @3:41;

at timestamp 13:02 a contribution CT6 has been defined by a user whose user identifier is ID1 for the image of the topic TP1 corresponding to the timecode @2:34;

at timestamp 13:27 a contribution CT7 has been defined by a user whose user identifier is ID1 for the image of the topic TP1 corresponding to the timecode @0:50.

FIGS. 6A-6I represent user interfaces according to at least one embodiment. In the example illustrated by FIGS. 6A-6I the topic media content is an image and the media content exchange is implemented in the context of an instant messaging session implemented by a host application. The host application is a messaging application incorporating functionalities described for the client application 106.

Figures 6A, 6B:
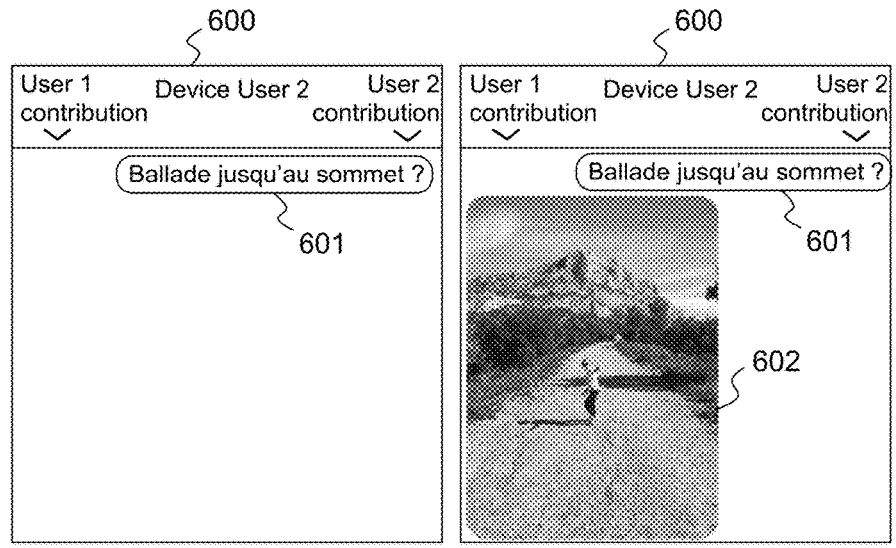
FIG. 6A-6I represent user interfaces according to at least one embodiment.
Figures 6C, 6D:
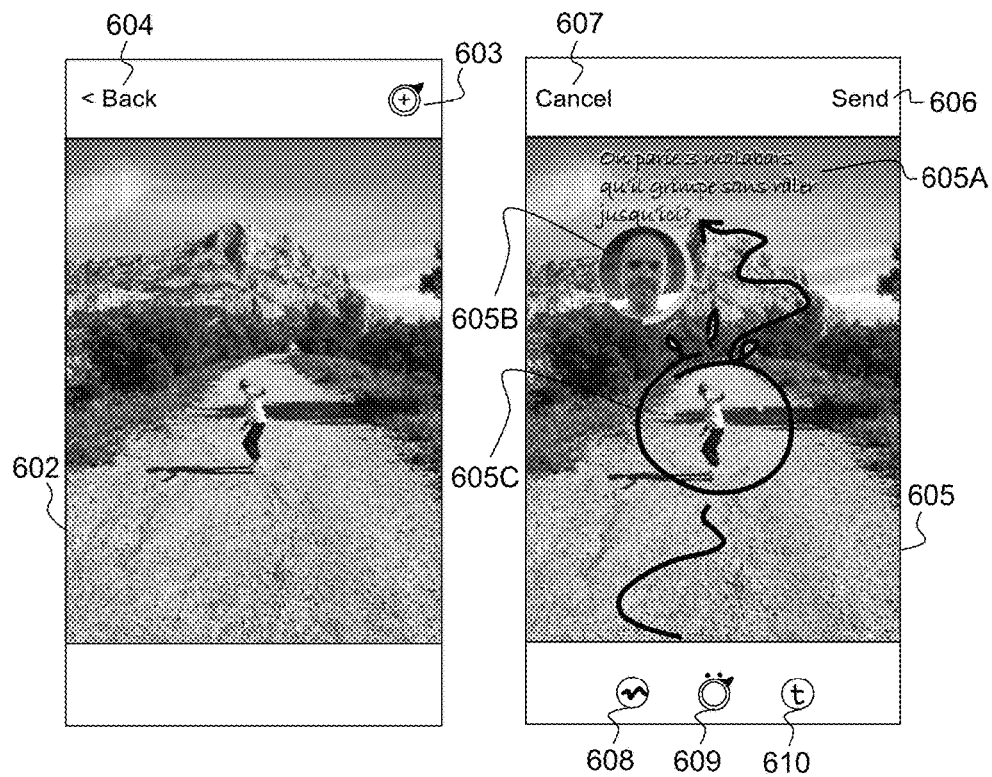

In the example of FIG. 6A, a message of the instant message session is displayed in a user interface 600 on the user device of user 101A. The contributions of user 101B appear on the left side of the user interface 600, while the contributions of user 101A appear on the right side of the user interface 600. User 101A has just sent a short text message 601 to user 101B. In the example of FIG. 6B, user 101A has received an image 602, represented by a thumbnail 602 on the left side of the user interface 600. The image 602 could be used as a topic of a media content exchange in the context of the current messaging session if user 101A does some predefined action, for example if user 101A selects the thumbnail of the image 602. Further to this action, the user interface of FIG. 6C is displayed. A first user interface element 603 (icon 603) is displayed for allowing user 101A to make a contribution to the topic. A second user interface element 604 (icon 604) is displayed for allowing user 101A to go back to the messaging session. Assuming that user 101A selects the first user interface element 603, the user interface of FIG. 6D is displayed. Three user interface elements are displayed which correspond respectively to different tools for generating a contribution: a first icon 608 for drawing a free form, a second icon 609 for recording an image or a video, and a third icon 610 for writing a text. Another user interface element 607 (an icon 607) may be displayed for allowing user 101A to cancel the action and to go back to the user interface of FIG. 6C. Another user interface element 606 (icon 606) may be displayed for allowing user 101A to validate the contribution and to register it. Once user 101A has made a contribution, the user interface comprises an image 605 representing this contribution by a combined media content resulting from the combination of the image 602, and of three contribution media contents 605A, 605B, 605C corresponding respectively to a text 605A, a video 605B and a free form 605C.

Figure 6E:
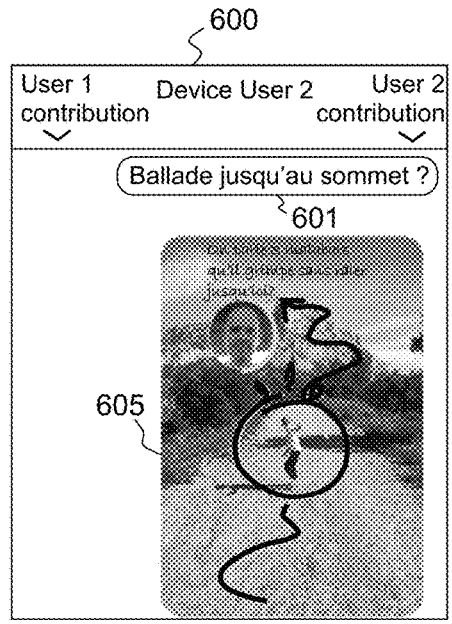

Assuming that user 101A validates the contribution using the user interface element 606, the user interface 600 is displayed again as illustrated by FIG. 6E and comprise a thumbnail for the image 605 representing the contribution of user 101A. The topic and contribution is also registered on request of the host application on the user device of user 101A. Topic association data and contribution association data are thus registered by the server application 107 and sent to the host application on the user device of user 101B.

Figure 6F:
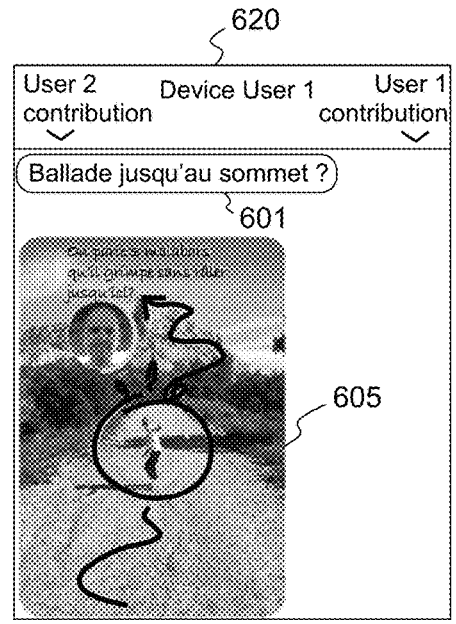
Figure 6G:
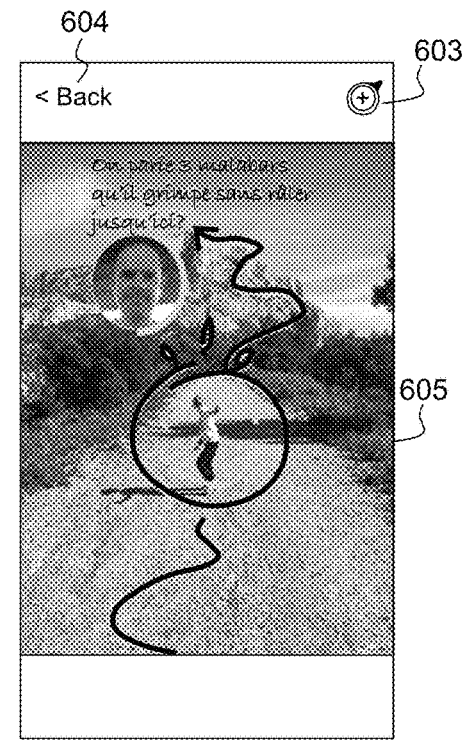
Figure 6H:
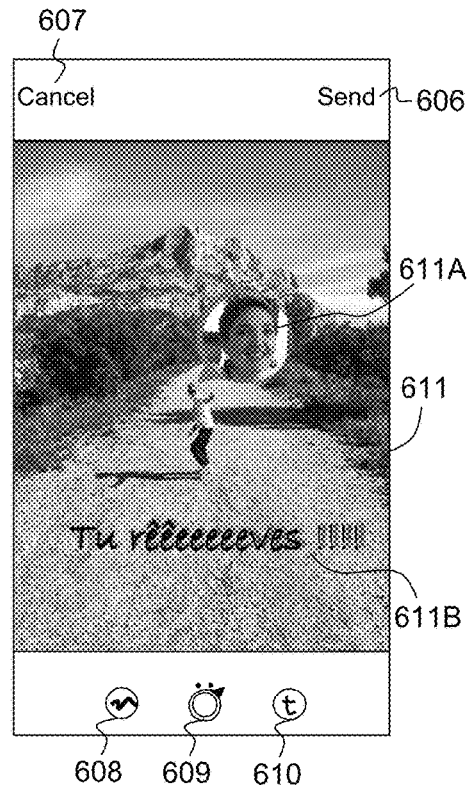

Following the contribution of user 101A, and as illustrated by FIG. 6F, a message of the instant message session is displayed in a user interface 610 of the host application on the user device of user 101B. The contribution of user 101A appears on the left side of the user interface 610, while the contribution of user 101B appear on the right side of the user interface 610. Thus the contribution (image 605) of user 101A is reproduced by the host application on the user device of user 101B by rendering a combined media content (image 605) corresponding to the combination of the image 602, and of the three contribution media contents 605A, 605B, 605C. A further contribution to the media content exchange could be made by user 101B if user 101B does some predefined action, for example if user 101B selects the thumbnail 605. Further to this action, the user interface of FIG. 6G is displayed. The user interface of FIG. 6G is similar to that of FIG. 6C. A first user interface element 603 (icon 603) is displayed for allowing user 101B to make a contribution to the topic. A second user interface element 604 (icon 604) is displayed for allowing user 101B to go back to the messaging session. Assuming that user 101A selects the first user interface element 603, the user interface of FIG. 6H is displayed. The user interface of FIG. 6H is similar to that of FIG. 6D. Three user interface elements are displayed which correspond respectively to different tools for generating a contribution: a first icon 608 for drawing a free form, a second icon 609 for recording an image or a video, and a third icon 610 for writing a text. Another user interface element 607 (an icon 607) may be displayed for allowing user 101A to cancel the action and to go back to the user interface of FIG. 6G. Another user interface element 606 (icon 606) may be displayed for allowing user 101A to validate the contribution and to register it. Once user 101B has made a contribution, the user interface comprises an image 611 representing this contribution by a combined media content resulting from the combination of the image 602, and of two contribution media contents 611A, 611B corresponding respectively to a video 611A and a text 611B.

Figure 6I:
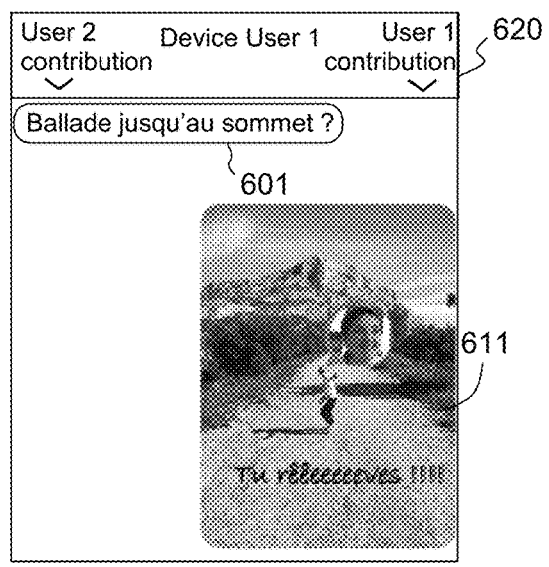

Assuming that user 101B validates the contribution, the user interface 610 is displayed again as illustrated by FIG. 6I and comprise a thumbnail of the image 611 representing the contribution of user 101B. The contribution of &à1b is also registered on request of the host application on the user device of user 101B. Contribution association data are thus registered by the server application 107 and sent to the host application on the user device of user 101A, thus enabling a reproduction of the contribution of user 101B on the user device of user 101A.

FIGS. 7A-7E represent user interfaces according to at least one embodiment. In the example illustrated by FIGS. 7A-7E the topic media content is an image or a video and the media content exchange is implemented in the context of a service of a media content provider implemented by a host application. The host application is for example a web application communicating with a server of the media content provider and incorporating functionalities described for the client application 106.

Figures 7A, 7B:
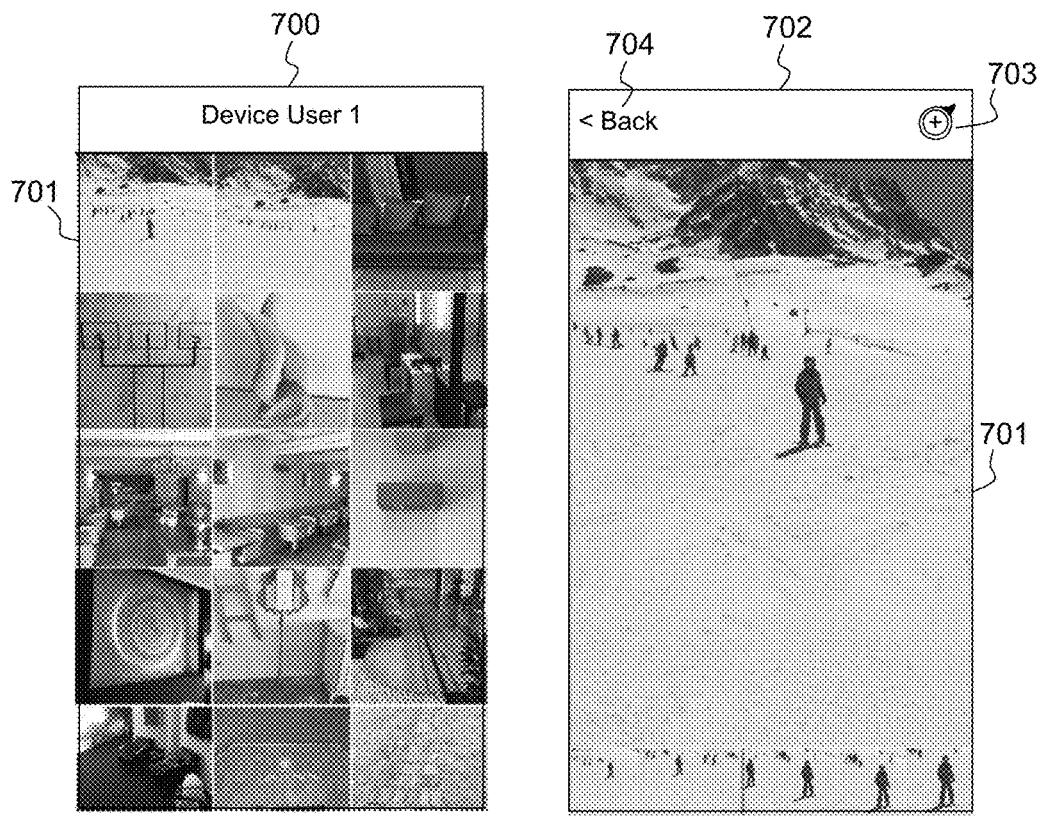

In the example of FIG. 7A, a user interface 700 of a host application for managing media content is displayed. The user interface 700 comprise thumbnails, each thumbnail representing an image-based content. For example, user interface 700 comprise a thumbnail 701 representing a video 701. The video 701 could be used as a topic of a media content exchange in the context of the host application if user 101A does some predefined action, for example if user 101A selects the thumbnail of the video 701. Further to this action, the user interface of FIG. 7B is displayed. The user interface of FIG. 7B is similar to that of FIG. 6C. A first user interface element 703 (icon 703) is displayed for allowing user 101A to make a contribution to the topic. A second user interface element 704 (icon 704) is displayed for allowing user 101A to go back to the host application. Assuming that user 101A selects the first user interface element 703, the user interface of FIG. 7C is displayed. Three user interface elements are displayed which correspond respectively to different tools for generating a contribution: a first icon 708 for drawing a free form, a second icon 709 for recording an image or a video, and a third icon 710 for writing a text. Another user interface element 706 (icon 706) may be displayed for allowing user 101A to cancel the action and to go back to the user interface of FIG. 7B. Another user interface element 705 (icon 705) may be displayed for allowing user 101A to validate the contribution, to register the contribution and to publish the contribution in the context of a service of a media content provider. Once user 101A has made a contribution, the user interface comprises a thumbnail 707 representing this contribution by a combined media content resulting from the combination of an image of the video 701, and of several contribution media contents comprising a text 707A and a free forms 707B.

Figure 7E:

Assuming that user 101A validates his contribution, the user interface 711 is displayed as illustrated by FIG. 7D and comprise the thumbnail 707 representing the contribution of user 101A. Further to the icons 705 and 706, the user interface 711 of FIG. 7D comprises several user interface elements (icons 720-724) which correspond respectively to different media content services (e.g. media content providers or media content applications) for publishing a contribution via the corresponding media content service. Assuming user 101A selects one of these icons 720-724, the contribution of the 101 is made available to other users via the corresponding service. More specifically, the contribution of user 101A may reproduced on a user interface of a host application implementing the selected media content service on the user device of another user, for example user 101B. As illustrated by FIG. 7E, the contribution of user 101A is reproduced by rendering of a combined media content (e.g. a video) resulting from the combination of at least one image of the video 701 and of the contribution media contents 707A-707B.

By recording contribution association data ASC1 representing each contribution made by different users to a media content exchange, the server application 107 keep track of those successive contributions and enables a reproduction of those contributions on the user devices of the other users participating to the media content exchange.

Each client application 106 may be notified on the basis of the registered association data ASC1 and/or AST1 so that a client application 106 may access to the media contents defining the topic and/or contribution and reproduce on a user device the contribution made by another user on another user device without having to send a combined media content from one user device to another user device.

The chronological order of the contributions may be reproduced thanks to the timestamp associated to a contribution. The user have made a contribution may be known to the recipient users thanks to the user identifier associated to a contribution.

The point of view or rendering point associated to a contribution is used to link a contribution to a given portion of the topic media content. As such different contributions may be made relatively to different portions of the topic media content.

The spatial and/or temporal relationships between a topic and a contribution may further be specified by temporal and/or spatial combination parameters by the contributing user and reproduced on the device of a recipient user.

Logical dependencies may be used for linking two or more contributions and thus providing improved way of rendering the successive contribution. A chain of contributions with logical dependencies may be used for defining sub-topic in a media content exchange.

Several topics may be used for a same media content exchange and the embodiments described above for a single topic in a media content exchange may be used for managing those different topics.

The methods, device and system described herein may be applicable in different contexts. For example, in a professional context, where different users have to share information/discuss/made comments on a different part of a given video content. For example for personal use, when different members of a family want to share a video content (concerning their last holidays) and send some comments relatively to different parts of the video content.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for sharing media contents between several users, said method comprising:
sending, by a first client application executing on a first user device of an initiating user, to a server application, at least one request for registering a media content as a topic of a media content exchange between several users,
allowing, by a second client application executing on a second user device, a contributing user to make a first contribution to said topic relatively to a first portion of the topic media content,
sending, by the second client application, to said server application at least one request for registering first association data representing said first contribution, said first association data representing an association between the first portion of the topic media content and at least one first contribution media content selected to form said first contribution,
receiving, by a third client application executing on a user device of a recipient user, from said server application, contribution reproduction data based on the first association data, and
reproducing, by the third client application, said first contribution by rendering a first combined media content resulting from a combination of at least one portion of said first contribution media content with said first portion of the topic media content.

2. The method according to claim 1, wherein said media content exchange is implemented in the context of a discussion group comprising the initiating user, the contribution user and the recipient user.

3. The method according to claim 1 or 2, wherein said media content exchange is implemented in the context of a service of media content provider.

4. The method according to claim 1, further comprising:
receiving, by the second client application from the server application, first access data for accessing from a user device to the topic media content via a remote media server,
receiving, by the third client application from the server application, first access data for accessing from a user device to the topic media content via said remote media server,
accessing, by the second client application, to the topic media content via said remote media server using said first access data, and
accessing, by the third client application, to the topic media content via said remote media server using said first access data.

5. The method according to claim 1 or 4, further comprising:
receiving by the third client application from the server application second access data for accessing from a user device to the contribution media content via a remote media server, and
accessing, by the third client application to the contribution media content via said remote media server using said second access data.

6. The method according to claim 1, wherein
said first association data comprises an identification of said first portion of the topic media content, said identification comprising at least one first rendering coordinate identifying a rendering point for the topic media content relatively to at least one axis of a rendering coordinate system associated with the topic media content.

7. The method according to claim 6, wherein
said topic media content is a three-dimensional content,
said rendering coordinate system is a four-dimensional rendering coordinate system comprises a three-dimensional coordinate system for defining camera positions and a temporal axis for defining temporal positions in the three-dimensional content,
said at least one first rendering coordinate comprises a camera position and a temporal position, and
said first said portion of said topic media content being a group of at least one image viewed from said camera position and starting at said temporal position.

8. The method according to claim 1, wherein
said first association data represent an association between said first portion of the topic media content, the first contribution media content and said second user, and
said first association data comprise a user identifier of said second user,
the method further comprising displaying, by the first client application, the user identifier of said second user.

9. The method according to claim 1, further comprising:
obtaining, by the second client application, at least one combination parameter,
sending, by the second client application, to said server application said at least one combination parameter, and
receiving, by the third client application, from said server application, said at least one combination parameter,
wherein said combination is performed by the first client application according to said at least one combination parameter.

10. The method according to claim 1, further comprising:
obtaining, by the second client application, at least one filtering parameter,
sending, by the second client application, to said server application said at least one filtering parameter, and
receiving, by the third client application, from said server application, said at least one filtering parameter,
wherein said rendering is performed by the third client application by applying to said first portion of said topic media content a filter according to said at least one filtering parameter.

11. The method according to claim 1, further comprising:
allowing, by a fourth client application executing on a user device of a second contributing user, said second contributing user to make a second contribution to said topic relatively to a second portion of the topic media content,
sending, by the fourth client application, to said server application at least one request for registering second association data representing the second contribution, said second association data representing an association between the second portion of the topic media content and at least one second contribution media content selected to form said second contribution,
receiving, by a fifth client application executing on a user device of a second recipient user, from said server application, second contribution reproduction data based on the second association data, and
reproducing, by the fifth client application, said second contribution by rendering a second combined media content resulting from a combination of at least one portion of said second contribution media content with said second portion of the topic media content.

12. The method according to claim 11, further comprising:
obtaining, by the fifth client application, a rendering order parameter defining a rendering order for the first contribution and the second contribution, and
reproducing, by the fifth client application, said first contribution by rendering a first combined media content resulting from a combination of at least one portion of said first contribution media content with said first portion of the topic media content,
wherein the rendering of the first combined media content and of the second combined media content is performed according to said rendering order parameter.

13. The method according to claim 12, further comprising:
obtaining, by the fourth client application logical dependency data defining at least one logical dependency between the first contribution media content and the second contribution media content,
sending, by the fourth client application, to said server application said logical dependency data, and
receiving, by the fifth client application, from said server application, said logical dependency data,
wherein said rendering order parameter is a dependency-based order based on said logical dependency data.

14. The method according to claim 1, further comprising:
uploading, by the first client application, the topic media content from the first user device to a first remote media server, and
downloading, by the second client application, from said first remote media server, at least one portion of the topic media content,
downloading, by the third client application, from said first remote media server, at least one portion of the topic media content.

15. The method according to claim 1, wherein said topic media content and first contribution media content are video contents and wherein said first portion of the topic media content comprises a group of at least one image of the topic media content.

16. The method according to claim 4, wherein said topic media content is a media content provided by a source application executing on said first user device, said first access data comprising an identification of the source application and at least one application parameter for obtaining the topic media content from the source application.

17. The method according to claim 4, wherein said topic media content is web page accessible via a web server, said first access data comprising a hypertext fink to said web page via said web server.

18. A user device comprising:
a processor,
a memory operatively coupled to the processor, said memory comprising instructions of a client application configured to communicate with a server application, said instructions comprising instructions for:
sending to said server application at least one request for registering a media content as a topic of a media content exchange between several users,
allowing a contributing user to make a first contribution to said topic relatively to a first portion of the topic media content on the user device,
sending to said server application at least one request for registering first association data representing said first contribution, said first association data representing an association between the first portion of the topic media content and at least one first contribution media content selected to form said first contribution,
receiving, from said server application, contribution reproduction data based on registered association data representative of a second contribution to said topic, wherein the second contribution to said topic relatively to a second portion of the topic media content is made on a second user device, and
reproducing said second contribution by rendering a first combined media content resulting from a combination of at least one portion of a second contribution media content with a second portion of the topic media content.

19. A computer-readable storage medium storing computer-executable instructions comprising instructions of a client application configured to communicate with a server application, said instructions comprising instructions for:
sending to said server application at least one request for registering a media content as a topic of a media content exchange between several users,
allowing a user to make a first contribution to said topic relatively to a first portion of the topic media content on the user device,
sending to said server application at least one request for registering first association data representing said first contribution, said first association data representing an association between the first portion of the topic media content and at least one first contribution media content selected to form said first contribution,
receiving, from said server application, contribution reproduction data based on registered association data representative of a second contribution to said topic, wherein the second contribution to said topic relatively to a second portion of the topic media content is made on a second user device, and
reproducing said second contribution by rendering a first combined media content resulting from a combination of at least one portion of a second contribution media content with a second portion of the topic media content.

20. A method for sharing media content between several users, the method comprising instructions for:
sending, by the client application to a server application, at least one request for registering a media content as a topic of a media content exchange between several users,
allowing, by the client application, a user to make a first contribution to said topic relatively to a first portion of the topic media content on the user device,
sending, by the client application to said server application, at least one request for registering first association data representing said first contribution, said first association data representing an association between the first portion of the topic media content and at least one first contribution media content selected to form said first contribution,
receiving, by the client application from said server application, contribution reproduction data based on registered association data representative of a second contribution to said topic, wherein the second contribution to said topic relatively to a second portion of the topic media content is made on a second user device, and
reproducing by the client application said second contribution by rendering a first combined media content resulting from a combination of at least one portion of a second contribution media content with a second portion of the topic media content.

* * * * *